US011061282B2

(12) United States Patent
Murakami et al.

(10) Patent No.: US 11,061,282 B2
(45) Date of Patent: Jul. 13, 2021

(54) LIQUID CRYSTAL ALIGNING AGENT, LIQUID CRYSTAL ALIGNMENT FILM, METHOD FOR PRODUCING SAME, LIQUID CRYSTAL ELEMENT AND POLYMER

(71) Applicant: JSR CORPORATION, Tokyo (JP)

(72) Inventors: Takuya Murakami, Tokyo (JP); Nobuo Yasuike, Tokyo (JP); Ryou Suhara, Tokyo (JP)

(73) Assignee: JSR CORPORATION, Tokyo (JP)

(*) Notice: Subject to any disclaimer, the term of this patent is extended or adjusted under 35 U.S.C. 154(b) by 0 days.

(21) Appl. No.: 16/479,921

(22) PCT Filed: Feb. 13, 2018

(86) PCT No.: PCT/JP2018/004924
§ 371 (c)(1),
(2) Date: Jul. 22, 2019

(87) PCT Pub. No.: WO2018/159284
PCT Pub. Date: Sep. 7, 2018

(65) Prior Publication Data
US 2019/0391420 A1    Dec. 26, 2019

(30) Foreign Application Priority Data

Feb. 28, 2017   (JP) .............................. JP2017-037430

(51) Int. Cl.
*G02F 1/1337*   (2006.01)
*C08G 73/10*    (2006.01)
(Continued)

(52) U.S. Cl.
CPC ........... *G02F 1/1337* (2013.01); *C08G 73/10* (2013.01); *C08G 73/105* (2013.01);
(Continued)

(58) Field of Classification Search
CPC ............. G02F 1/1337; G02F 1/133711; G02F 1/133788; G02F 1/133723; C08G 73/10;
(Continued)

(56) References Cited

U.S. PATENT DOCUMENTS

| 2013/0158208 A1* | 6/2013 | Yang | C08G 73/16 525/421 |
| 2014/0154428 A1* | 6/2014 | Schadt | C07D 207/452 428/1.2 |
| 2016/0244566 A1* | 8/2016 | Kunimi | C08G 73/1071 |

FOREIGN PATENT DOCUMENTS

| JP | 2014199446 | 10/2014 |
| JP | 2014199446 A * | 10/2014 |

(Continued)

OTHER PUBLICATIONS

"International Search Report (Form PCT/ISA/210) of PCT/JP2018/004924," dated May 15, 2018, with English translation thereof, pp. 1-2.

(Continued)

*Primary Examiner* — Anthony J Frost
(74) *Attorney, Agent, or Firm* — JCIPRNET

(57) ABSTRACT

According to the present invention, a liquid crystal aligning agent is configured to contain a polymer (P) which has at least one partial structure selected from the group consisting of a partial structure represented by formula (1) and a partial structure represented by formula (2). In formula (1) and formula (2), $X^1$ represents a tetravalent organic group that has a cyclobutane ring structure, while having at least one substituent in the ring portion of the cyclobutane ring; $X^2$ represents a divalent organic group of a specific structure which has an aliphatic structure and a divalent nitrogen-containing heterocyclic group; and each of $R^5$ and $R^6$ (Continued)

independently represents a hydrogen atom or a monovalent organic group having 1-6 carbon atoms.

12 Claims, 1 Drawing Sheet

(51) Int. Cl.
 *C09K 19/54* (2006.01)
 *C09K 19/56* (2006.01)
(52) U.S. Cl.
 CPC ..... *C08G 73/1042* (2013.01); *C08G 73/1064* (2013.01); *C08G 73/1071* (2013.01); *C08G 73/1078* (2013.01); *C08G 73/1085* (2013.01); *C09K 19/542* (2013.01); *C09K 19/56* (2013.01); *C09K 2323/00* (2020.08); *G02F 1/133711* (2013.01); *G02F 1/133723* (2013.01); *G02F 1/133788* (2013.01)
(58) Field of Classification Search
 CPC .............. C08G 73/105; C08G 73/1064; C08G 73/1071; C08G 73/1042; C08G 73/1085; C08G 73/1078; C09K 19/56; C09K 19/542
 See application file for complete search history.

(56) References Cited

FOREIGN PATENT DOCUMENTS

| | | |
|---|---|---|
| JP | 2016218149 | 12/2016 |
| KR | 20140063795 | 5/2014 |
| WO | 2012176822 | 12/2012 |

OTHER PUBLICATIONS

"Office Action of Japan Counterpart Application", dated Jul. 7, 2020, with English translation thereof, p. 1-p. 4.
"Office Action of Korea Counterpart Application", dated Aug. 7, 2020, with English translation thereof, pp. 1-14.
Office Action of Japan Counterpart Application, with English translation thereof, dated Jan. 19, 2021, pp. 1-6.

\* cited by examiner

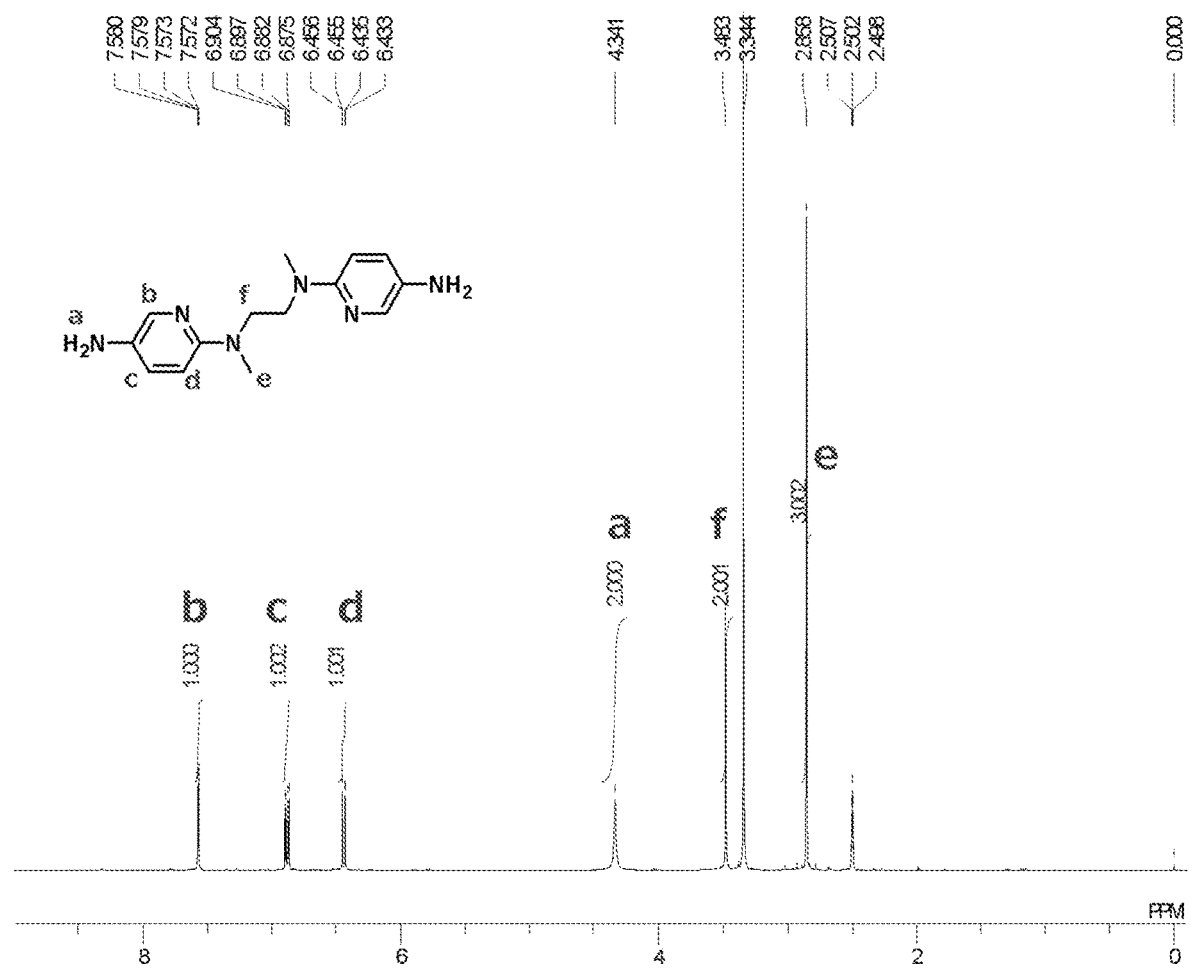

LIQUID CRYSTAL ALIGNING AGENT, LIQUID CRYSTAL ALIGNMENT FILM, METHOD FOR PRODUCING SAME, LIQUID CRYSTAL ELEMENT AND POLYMER

CROSS-REFERENCE TO RELATED APPLICATION

This application is a 371 application of the International PCT application serial no. PCT/JP2018/004924, filed on Feb. 13, 2018, which claims the priority benefit of Japan Patent Application No. 2017-037430, filed on Feb. 28, 2017. The entirety of each of the above-mentioned patent applications is hereby incorporated by reference herein and made a hart of this specification.

TECHNICAL FIELD

The present disclosure relates to a liquid crystal aligning agent, a liquid crystal alignment film and a method for producing the same, a liquid crystal element, and a polymer.

BACKGROUND ART

Liquid crystal elements are widely used for televisions, mobile devices, and various monitors. In addition, in liquid crystal elements, a liquid crystal alignment film for controlling alignment of liquid crystal molecules in a liquid crystal cell is used. In the related art, regarding a method of obtaining an organic film having liquid crystal alignment regulating power, a method of rubbing an organic film, a method of obliquely depositing silicon oxide, a method of forming a monolayer film having a long-chain alkyl group, and a method of emitting light to a photosensitive organic film (photo-alignment method), and the like are known.

In recent years, various studies regarding the photo-alignment method have been conducted because it is then possible to prevent the generation of static electricity and dust and it is possible to impart uniform liquid crystal alignment properties to a photosensitive organic film, and it is also possible to precisely control a liquid crystal alignment direction (for example, refer to Patent Literature 1). Patent Literature 1 discloses that polarized light is emitted to a film obtained by applying a liquid crystal aligning agent containing a polyamic acid having a cyclobutane ring structure in the main chain to a substrate and baking it to form a liquid crystal alignment film.

CITATION LIST

Patent Literature

[Patent Literature 1]
PCT International Publication No. WO 2012/176822

SUMMARY OF INVENTION

Technical Problem

When a liquid crystal alignment film is obtained by a photo-alignment treatment, the alignment regulating power of liquid crystal molecules is not sufficient compared to a rubbing treatment, and burn-in called an AC afterimage is likely to occur. The AC afterimage is an afterimage caused when a liquid crystal element is driven for a long time and thus an initial alignment direction deviates from an initial direction when the liquid crystal element is produced. Improving a degree of alignment order of the liquid crystal alignment film is one effective method in order to reduce the AC afterimage in the liquid crystal element. For liquid crystal elements, it is desirable to sufficiently reduce the AC afterimage in order to satisfy the recent demand for higher performance.

In addition, in recent years, liquid crystal elements have been applied to a wide range of devices and applications from large screen liquid crystal televisions to small display devices such as a smartphone and a tablet PC. According to such versatility, it is assumed that liquid crystal elements are placed or installed at places in which the temperature can easily become higher such as in a car or outdoors, or they are driven for a longer time than before, and used under more severe temperature conditions. Therefore, high reliability with respect to heat resistance is required for liquid crystal elements. However, when a liquid crystal alignment film is obtained by a photo-alignment treatment using a liquid crystal aligning agent containing a polyimide polymer having a cyclobutane ring structure in the main chain, due to decomposition products generated when light is emitted to a coating film, micro bright spots are likely to occur when the obtained liquid crystal element is exposed under a high temperature environment for a long time. Therefore, in those in the related art, there is a concern of the reliability with respect to heat resistance (in particular, long-term heat resistance) being inferior.

The present disclosure has been made in view of the above circumstances, and one objective is to provide a liquid crystal aligning agent in which, when a liquid crystal alignment film is obtained by a photo-alignment method, it is possible to obtain a liquid crystal element having excellent AC afterimage characteristics and long-term heat resistance.

Solution to Problem

In order to solve the above problems, the present disclosure provides the following aspects.
<1> A liquid crystal aligning agent including a polymer (P) having at least one selected from the group consisting of a partial structure represented by the following Formula (1) and a partial structure represented by the following Formula (2):

[Chem. 1]

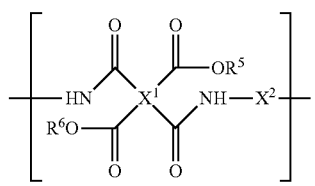

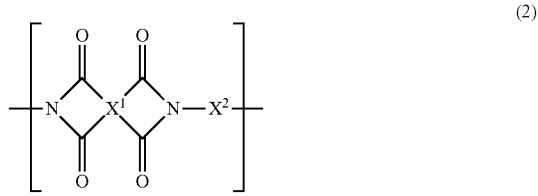

(In Formula (1) and Formula (2), $X^1$ is a tetravalent organic group having a cyclobutane ring structure and has at least one substituent in a ring portion of a cyclobutane ring. $X^2$ is a divalent organic group represented by the following Formula (4). $R^5$ and $R^6$ each are independently a hydrogen atom or a monovalent organic group having 1 to 6 carbon atoms.)
[Chem. 2]

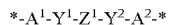 (4)

(In Formula (4), $A^1$ and $A^2$ each are independently a divalent aromatic ring group and may have a substituent in a ring portion. Here, at least one of $A^1$ and $A^2$ is a divalent nitrogen-containing heterocyclic group in which two hydrogen atoms are removed from a ring portion of one nitrogen-containing heterocyclic ring selected from the group consisting of a pyridine ring, a pyrazine ring, a pyrimidine ring and a pyridazine ring and may have a substituent in a ring portion. $Y^1$ and $Y^2$ each are independently an oxygen atom, a sulfur atom, or "—$NR^7$—" ($R^7$ is a hydrogen atom or a monovalent organic group). $Z^1$ is a divalent organic group having an aliphatic structure and 1 to 15 carbon atoms, at least one substituent for $Y^1$ and $Y^2$ and $Z^1$ may be bonded to form a ring structure, and substituents for $Y^1$ and $Y^2$ may be bonded to form a ring structure together with $Z^1$ and "*" indicates a bond.)

<2> A liquid crystal alignment film formed using the liquid crystal aligning agent of <1>.

<3> A method for producing a liquid crystal alignment film including a photo-alignment process in which a coating film is formed using the liquid crystal aligning agent of <1>, and a light emission treatment is performed on the coating film to impart a liquid crystal alignment ability.

<4> A liquid crystal element including the liquid crystal alignment film of <2>.

<5> A polymer including at least one selected from the group consisting of a partial structure represented by Formula (1) and a partial structure represented by Formula (2).

Advantageous Effects of Invention

According to the liquid crystal aligning agent of the present disclosure, when a liquid crystal alignment film is obtained by a photo-alignment method, it is possible to obtain a liquid crystal element having excellent long-term heat resistance and a reduced AC afterimage.

BRIEF DESCRIPTION OF DRAWING

FIG. 1 shows a $^1$H-NMR spectrum of a diamine (DA-1).

DESCRIPTION OF EMBODIMENTS

Components added to a liquid crystal aligning agent of the present disclosure and other components that are optionally added thereto as necessary will be described below.

<<Polymer (P)>>

The liquid crystal aligning agent of the present disclosure contains a polymer (P) having at least one selected from the group consisting of a partial structure represented by Formula (1) and a partial structure represented by Formula (2). In Formula (1) and Formula (2), $X^1$ is a tetravalent organic group having a cyclobutane ring structure, and has at least one substituent in a ring portion of the cyclobutane ring. Examples of the substituent that the cyclobutane ring has include a halogen atom, an alkyl group, a halogenated alkyl group, an alkoxy group, an alkenyl group, and an alkynyl group. The number of substituents is not particularly limited, and is preferably 1 to 4.

$X^1$ is preferably a group represented by the following Formula (3).

[Chem. 3]

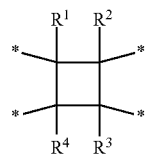 (3)

(In Formula (3), $R^1$ to $R^3$ each are independently a hydrogen atom, a halogen atom, an alkyl group having 1 to 6 carbon atoms, a halogenated alkyl group having 1 to 6 carbon atoms, an alkoxy group having 1 to 6 carbon atoms, a thioalkyl group having 1 to 6 carbon atoms, an alkenyl group having 2 to 6 carbon atoms, an alkynyl group having 2 to 6 carbon atoms, or "—$COR^{20}$" (here, $R^{20}$ is an alkyl group having 1 to 6 carbon atoms, a fluorine-containing alkyl group, an alkoxy group or a fluorine-containing alkoxy group). $R^4$ is a halogen atom, an alkyl group having 1 to 6 carbon atoms, a halogenated alkyl group having 1 to 6 carbon atoms, an alkoxy group having 1 to 6 carbon atoms, a thioalkyl group having 1 to 6 carbon atoms, an alkenyl group having 2 to 6 carbon atoms, an alkynyl group having 2 to 6 carbon atoms, or "—$COR^{20}$". Here, adjacent groups among $R^1$ to $R^4$ may be bonded to form a ring structure, and "*" indicates a bond.)

Here, when $X^1$ in Formula (1) is a group represented by Formula (3), Formula (1) includes the following Formula (1-A) and the following Formula (1-B).

[Chem. 4]

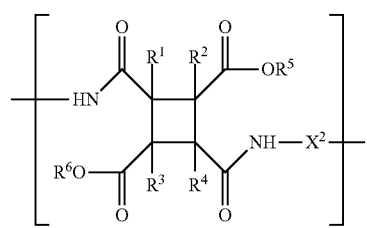 (1-A)

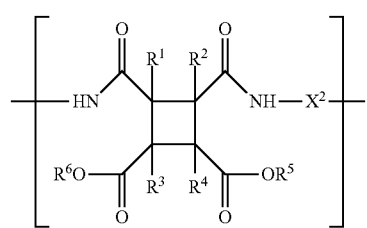 (1-B)

(In Formula (1-A) and Formula (1-B), $X^2$, $R^5$ and $R^6$ have the same meanings as $X^2$, $R^5$ and $R^6$ in Formula (1). $R^1$ to $R^4$ each have the same meanings as $R^1$ to $R^4$ in Formula (3).)

In Formula (1) and Formula (2), $X^2$ is a divalent organic group represented by Formula (4). In Formula (4), $A^1$ and $A^2$ each are independently a divalent aromatic ring group. Here, at least one of $A^1$ and $A^2$ is a divalent nitrogen-containing heterocyclic group (hereinafter referred to as a "nitrogen-containing heterocyclic group A") in which two hydrogen atoms are removed from a ring portion of one nitrogen-containing heterocyclic ring selected from the group consisting of a pyridine ring, a pyrazine ring, a pyrimidine ring and a pyridazine ring. Preferably, both $A^1$ and $A^2$ are a divalent nitrogen-containing heterocyclic group A because it is then possible to obtain a liquid crystal element in which fewer micro bright spots occur and it is possible to further improve the photoreactivity of the polymer. Among these, the nitrogen-containing heterocyclic ring that $A^1$ and $A^2$ have is preferably a pyridine ring.

When only one of $A^1$ and $A^2$ is a divalent nitrogen-containing heterocyclic group A, the other group is preferably a divalent cyclic group in which two hydrogen atoms are removed from a ring portion of a benzene ring, a naphthalene ring or an anthracene ring. Here, aromatic rings (including a nitrogen-containing heterocyclic ring) of $A^1$ and $A^2$ may have a substituent in a ring portion. Examples of the substituent include an alkyl group having 1 to 6 carbon atoms.

In Formula (4), $Y^1$ and $Y^2$ each are independently an oxygen atom, a sulfur atom, or "—$NR^7$—" ($R^7$ is a hydrogen atom or a monovalent organic group). Examples of the monovalent organic group for $R^7$ include an alkyl group having 1 to 6 carbon atoms and a protecting group. The protecting group is preferably a group which is removed due to heat, and examples thereof include a carbamate protecting group, an amide protecting group, an imide protecting group, and a sulfonamide protecting group. Among these, the protecting group is preferably a tert-butoxycarbonyl group because it is then easily removable due to heat and an amount of a deprotected part remaining in the film is reduced.

$Y^1$ and $Y^2$ are preferably "—$NR^7$—" or a sulfur atom because it is then possible to obtain a polymer having higher photoreactivity. More preferably, at least one of $Y^1$ and $Y^2$ is "—$NR^7$—", and most preferably $Y^1$ and $Y^2$ both are "—$NR^7$—". $R^7$ in "—$NR^7$—" is preferably an alkyl group having 1 to 6 carbon atoms and more preferably an alkyl group having 1 to 3 carbon atoms because it is then possible to further improve photoreactivity of the polymer (P). In addition, in consideration of photoreactivity, particularly preferably, the nitrogen-containing heterocyclic ring that $A^1$ and $A^2$ have is a pyridine ring, and $Y^1$ and $Y^2$ are "—$NR^7$—" or a sulfur atom.

Preferably, $A^1$ and $A^2$ in Formula (4) are a divalent nitrogen-containing heterocyclic group A, and $Y^1$ and $Y^2$ are bonded to carbon atoms adjacent to nitrogen atoms in the ring of the nitrogen-containing heterocyclic ring with respect to the nitrogen-containing heterocyclic ring that $A^1$ and $A^2$ have because it is then possible to further enhance an effect of improving liquid crystal alignment properties and AC afterimage characteristics of the obtained liquid crystal element. Particularly preferably, in Formula (4), the nitrogen-containing heterocyclic ring that $A^1$ and $A^2$ have is a pyridine ring, and in the structure, bonding sites of $Y^1$ and $Y^2$ on the pyridine ring are at the ortho position with respect to a nitrogen atom of the pyridine ring and at the para position with respect to a nitrogen atom in Formula (1) and Formula (2) which is bonded to $X^2$. Specifically, the group represented by Formula (4) is preferably a group represented by the following Formula (4A).

[Chem. 5]

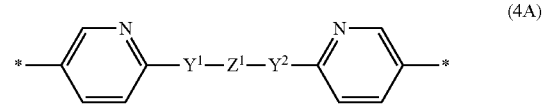

(4A)

(In Formula (4A), $Y^1$, $Y^2$ and $Z^1$ have the same meanings as those in Formula (4), and "*" indicates a bond.)

$Z^1$ is a divalent organic group having an aliphatic structure and 1 to 15 carbon atoms. Here, in this specification, the "aliphatic structure" refers to a chain hydrocarbon structure and an alicyclic hydrocarbon structure. The "chain hydrocarbon structure" refers to a linear hydrocarbon structure and a branched hydrocarbon structure which are composed of only a chain structure without a cyclic structure. Here, the chain hydrocarbon structure may be saturated or unsaturated. The "alicyclic hydrocarbon structure" refers to a hydrocarbon structure that includes only an alicyclic hydrocarbon structure as a ring structure without an aromatic ring structure. Here, the alicyclic hydrocarbon structure is not necessarily composed of only an alicyclic hydrocarbon structure and may include a chain structure in a part thereof.

$Z^1$ may be bonded to at least one substituent ($R^7$) for $Y^1$ and $Y^2$ to form a ring structure. Examples of the ring structure formed by bonding $Z^1$ and at least one substituent for $Y^1$ and $Y^2$ include a piperazine ring and a piperidine ring. In addition, substituents for $Y^1$ and $Y^2$ may be bonded to each other to form a ring structure together with $Z^1$. Examples of the ring structure formed by bonding $Y^1$ and $Y^2$ include a piperidine ring.

$Z^1$ may have an aliphatic structure, and $Z^1$ is preferably a divalent organic group represented by the following Formula (5) because it is then possible to obtain a liquid crystal element in which fewer micro bright spots due to a photo-degradable product occur and which has high long-term heat resistance even if it is driven for a long time under a high temperature environment.

[Chem. 6]

(5)

(In Formula (5), $R^9$ and $R^{10}$ each are independently an alkanediyl group, and a total number of carbon atoms for $R^9$ and $R^{10}$ is 1 to 15. Here, in Formula (4), at least one substituent for $Y^1$ and $Y^2$ and $R^9$ may be bonded to form a ring structure, at least one substituent for $Y^1$ and $Y^2$ and $R^{10}$ may be bonded to form a ring structure, and at least one substituent for $Y^1$ and $Y^2$ and a substituent for $Y^3$ may be bonded to form a ring structure together with $R^9$ or $R^{10}$. $Y^3$ is an oxygen atom, a sulfur atom, or "—$NR^8$—" ($R^8$ is a hydrogen atom or a monovalent organic group). p is an integer of 0 to 4. When p is 2 or more, a plurality of $R^9$'s and $Y^3$'s may be the same or different from each other.)

In Formula (5), a total number of carbon atoms for $R^9$ and $R^{10}$ (a total number of carbon atoms for a plurality of $R^9$'s and $R^{10}$'s when p is 2 or more) is preferably 2 or more and more preferably 3 or more because it is then possible to promote realignment of molecular chains due to heat when a liquid crystal alignment film is produced and fewer micro bright spots can occur in the liquid crystal element. $R^9$ and $R^{10}$ may be linear or branched, and preferably linear.

Regarding specific examples of $R^8$, description of $R^7$ in "—$NR^7$—" described above applies. p is preferably 0 to 2. In addition, the polymer (P) is preferably a copolymer having two or more types of $X^2$ with different total numbers of carbon atoms for $R^9$ and $R^{10}$.

Each of $R^9$ and $R^{10}$ may be bonded to at least one substituent ($R^7$) for $Y^1$ and $Y^2$ to form a ring structure. Examples of the ring structure formed by bonding the substituent for $Y^1$ or $Y^2$ and $R^9$ or $R^{10}$ include a piperazine ring and a piperidine ring. In addition, substituents for $Y^1$ and $Y^2$ may be bonded to each other to form a ring structure together with $R^9$, $Y^3$ and $R^{10}$. Examples of the ring structure formed by bonding $Y^1$ and $Y^2$ include a piperidine ring.

A group represented by Formula (5) is preferably a chain form in order to reduce the occurrence of micro bright spots in the liquid crystal element. Specifically, a group represented by Formula (5) is preferably an alkanediyl group having 1 to 15 carbon atoms or a group having an oxygen atom, a sulfur atom, or "—$NR^8$—" between carbon-carbon bonds of the alkanediyl group.

The polymer (P) is at least one selected from the group consisting of a polyamic acid, a polyamic acid ester and a polyimide. The polymer (P) has a partial structure derived from a tetracarboxylic acid derivative having a cyclobutane ring structure including at least one substituent in a ring portion and a partial structure derived from a diamine compound having a divalent organic group represented by Formula (4). A method of synthesizing such a polymer (P) is not particularly limited, and the polymer (P) can be obtained by appropriately combining general methods in organic chemistry. Here, in this specification, the "tetracarboxylic acid derivative" includes a tetracarboxylic dianhydride, a tetracarboxylic acid diester and a tetracarboxylic acid diester dihalide.

(Polyamic Acid)

When the polymer (P) is a polyamic acid, the polyamic acid (hereinafter referred to as a "polyamic acid (P)") can be obtained by reacting, for example, a tetracarboxylic dianhydride including a tetracarboxylic dianhydride having a cyclobutane ring structure including at least one substituent in a ring portion (hereinafter referred to as a "specific acid dianhydride") with a diamine compound including a diamine compound having a divalent organic group represented by Formula (4) (hereinafter referred to as a "specific diamine").

(Specific Acid Dianhydride)

Examples of the specific acid dianhydride include a tetracarboxylic dianhydride having a partial structure represented by Formula (3). Specific examples of the specific acid dianhydride include compounds represented by, for example, the following Formula (TA-1-1) to Formula (TA-1-15).

[Chem. 7]

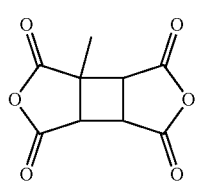

(TA-1-1)

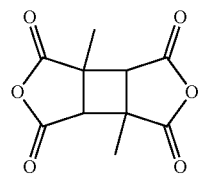

(TA-1-2)

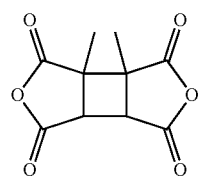

(TA-1-3)

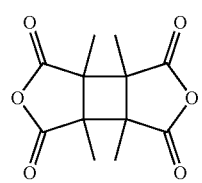

(TA-1-4)

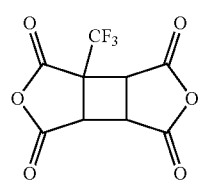

(TA-1-5)

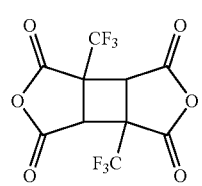

(TA-1-6)

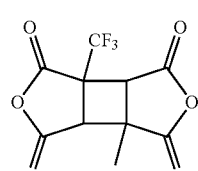

(TA-1-7)

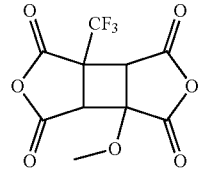

(TA-1-8)

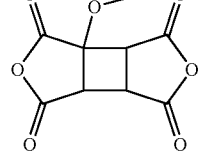

(TA-1-9)

-continued (TA-1-10)

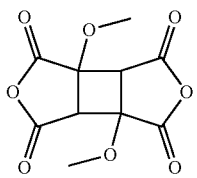

(TA-1-11)

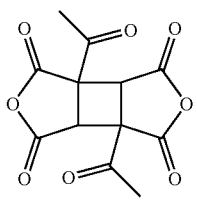

(TA-1-12)

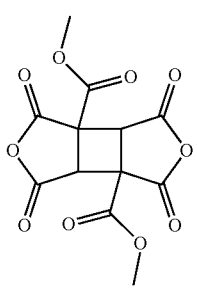

(TA-1-13)

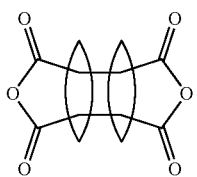

(TA-1-14)

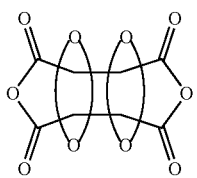

(TA-1-15)

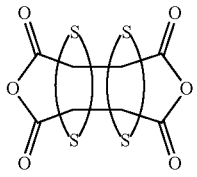

Among these, regarding the specific acid dianhydride, compounds represented by Formula (TA-1-1) to Formula (TA-1-12) are preferable, compounds represented by Formula (TA-1-1) to Formula (TA-1-7) are more preferable, and 1,3-dimethyl-1,2,3,4-cyclobutanetetracarboxylic dianhydride (a compound represented by Formula (TA-1-2)) is particularly preferable. Here, one type of specific acid dianhydride can be used alone or two or more thereof can be used in combination.

When the polyamic acid (P) is synthesized, regarding the tetracarboxylic dianhydride, a tetracarboxylic dianhydride other than the specific acid dianhydride may be used together with the specific acid dianhydride. The other tetracarboxylic dianhydride is not particularly limited as long as it does not have a cyclobutane ring structure including at least one substituent in a ring portion. Regarding specific examples of the other tetracarboxylic dianhydride, as an aliphatic tetracarboxylic dianhydride, for example, ethylenediaminetetraacetic acid dianhydride;

as an alicyclic tetracarboxylic dianhydride, for example, 1,2,3,4-cyclobutane tetracarboxylic dianhydride, 2,3,5-tricarboxycyclopentylacetic acid dianhydride, 5-(2,5-dioxotetrahydrofuran-3-yl)-3a, 4,5,9b-tetrahydronaphtho[1,2-c]furan-1,3-dione, 5-(2,5-dioxotetrahydrofuran-3-yl)-8-methyl-3a, 4,5,9b-tetrahydronaphtho[1,2-c]furan-1,3-dione, 5-(2,5-dioxotetrahydro-3-furanyl)-3-methyl-3-cyclohexene-1,2-dicarboxylic acid anhydride, 3,5,6-tricarboxy-2-carboxymethyl norbornane-2:3,5:6-dianhydride, 2,4,6,8-tetracarboxybicyclo[3.3.0]octane-2:4,6:8-dianhydride, cyclohexanetetracarboxylic dianhydride, and cyclopentane tetracarboxylic dianhydride; as an aromatic tetracarboxylic dianhydride, for example, pyromellitic dianhydride, 4,4'-oxydiphthalic anhydride, 4,4'-(hexafluoroisopropylidene) diphthalic anhydride, p-phenylene bis(trimellitic acid monoester anhydride), ethylene glycol bis(anhydro trimellitate), 1,3-propylene glycol bis(anhydro trimellitate), and 3,3',4,4'-benzophenonetetracarboxylic dianhydride; may be exemplified, and a tetracarboxylic dianhydride described in Japanese Unexamined Patent Application Publication No. 2010-97188 can be used.

Regarding the other tetracarboxylic dianhydride, among these, at least one selected from the group consisting of ethylenediaminetetraacetic acid dianhydride, 1,2,3,4-cyclobutane tetracarboxylic dianhydride, 2,3,5-tricarboxycyclopentylacetic acid dianhydride, pyromellitic dianhydride, and 3,3',4,4'-benzophenonetetracarboxylic dianhydride can be preferably used as a copolymer component because it is then possible to obtain a liquid crystal element in which fewer micro bright spots occur even after it is driven for a long time. Here, when the polymer (P) is synthesized, one type of other tetracarboxylic dianhydride can be used alone or two or more thereof can be used in combination.

When the polyamic acid (P) is synthesized, a proportion of a specific acid dianhydride used is preferably 30 mol % or more, more preferably 50 mol % or more, and most preferably 80 mol % or more with respect to a total amount of the tetracarboxylic dianhydride used for synthesis because it is then possible to obtain sufficient effects of the present disclosure.

(Specific Diamine)

Examples of a specific diamine include a compound represented by the following Formula (DA).

[Chem. 8]

$$H_2N-A^1-Y^1-Z^1-Y^2-A^2-NH_2 \quad \text{(DA)}$$

(In Formula (DA), $A^1$, $A^2$, $Y^1$, $Y^2$ and $Z^1$ have the same meanings as those in Formula (4).)

The description of Formula (4) similarly applies to $A^1$, $A^2$, $Y^1$, $Y^2$ and $Z^1$ in Formula (DA). Specific examples of the specific diamine include compounds represented by, for example, the following Formula (DA-1) to Formula (DA-45). Here, in the formulae, "Boc" indicates a tert-butoxycarbonyl group (hereinafter the same).

[Chem. 9]

(DA-1)

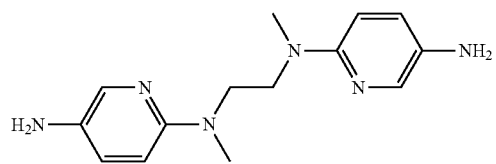

(DA-2)
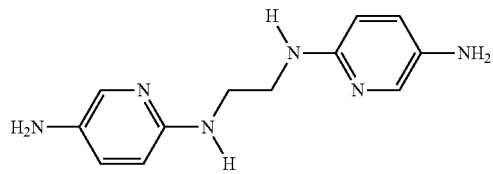
(DA-3)
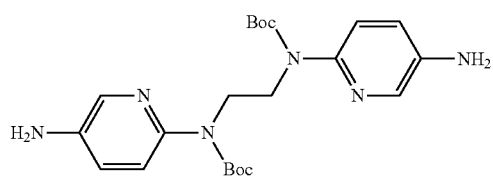
(DA-4)
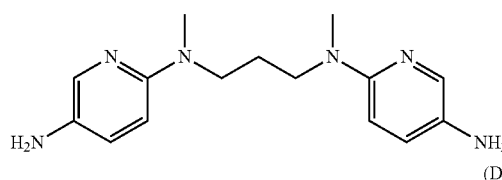
(DA-5)
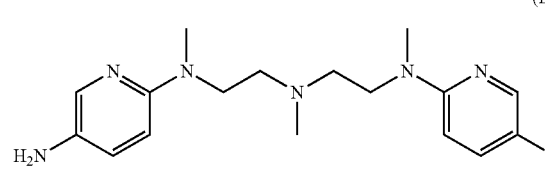
(DA-6)
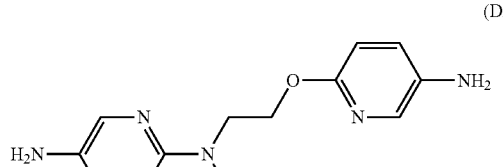
(DA-7)
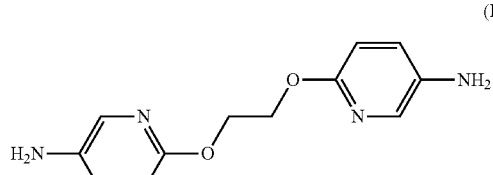
(DA-8)
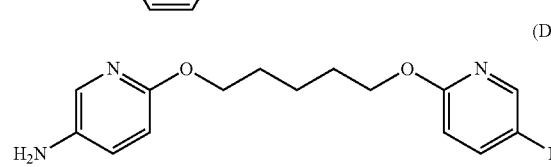
(DA-9)
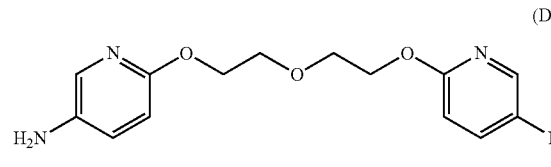
(DA-10)
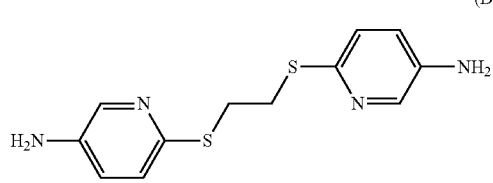
(DA-11)
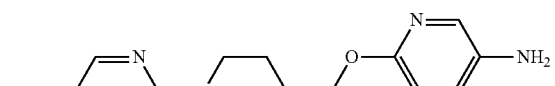
(DA-12)
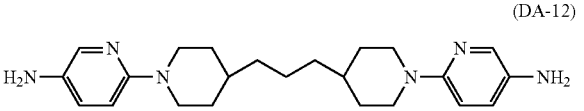
(DA-13)
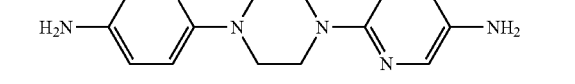
[Chem. 10]
(DA-14)
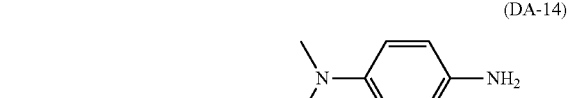
(DA-15)
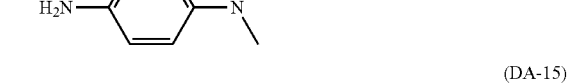
(DA-16)
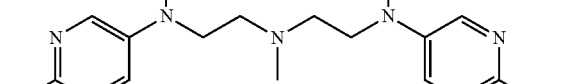
(DA-17)
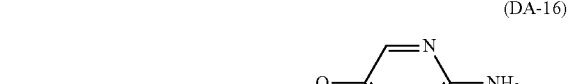
(DA-18)
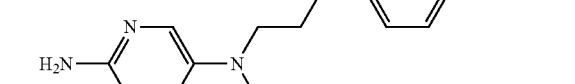
(DA-19)
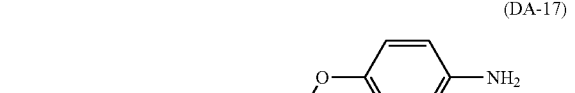

(DA-20)
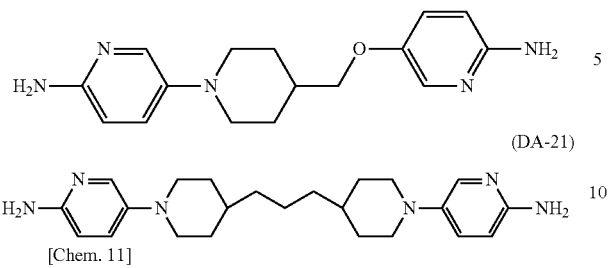
(DA-21)
(DA-22)
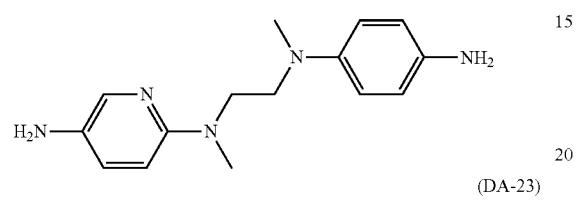
(DA-23)
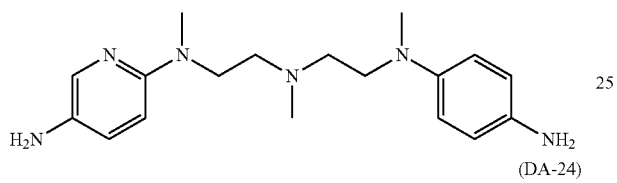
(DA-24)
[Chem. 11]
[Chem. 12]
(DA-30)
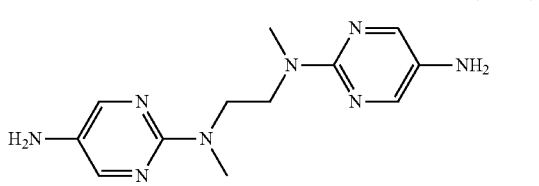
(DA-31)
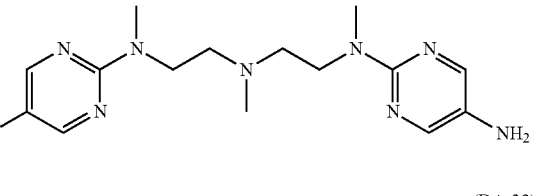
(DA-32)
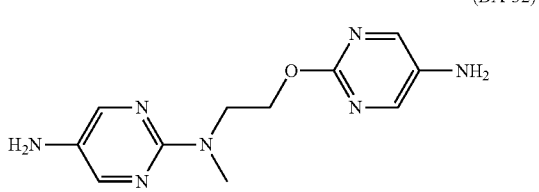
(DA-33)
(DA-25)
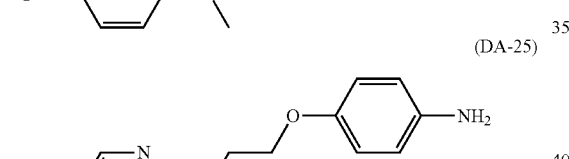
(DA-26)
(DA-27)
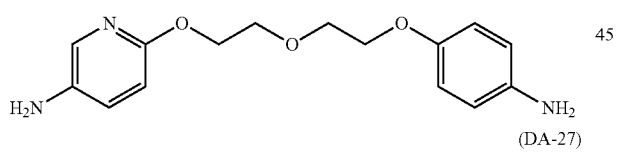
(DA-28)
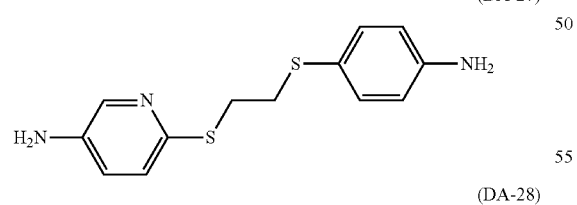
(DA-29)
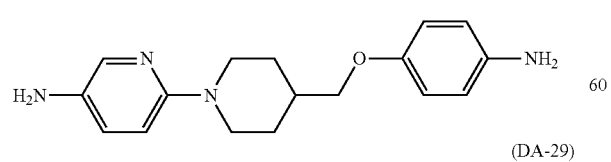
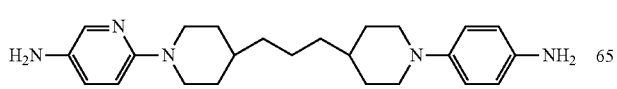
(DA-34)
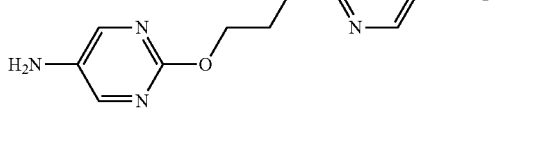
(DA-35)
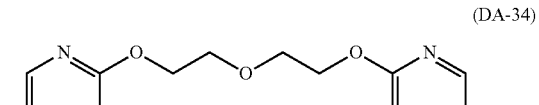
(DA-36)
(DA-37)
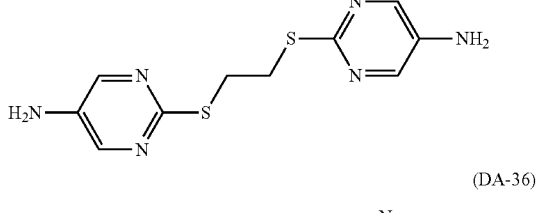
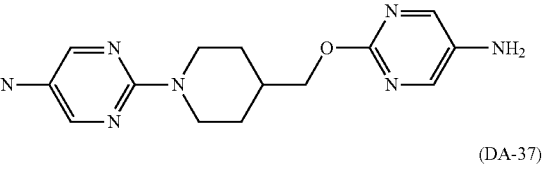
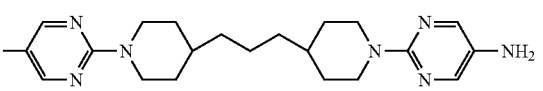

-continued

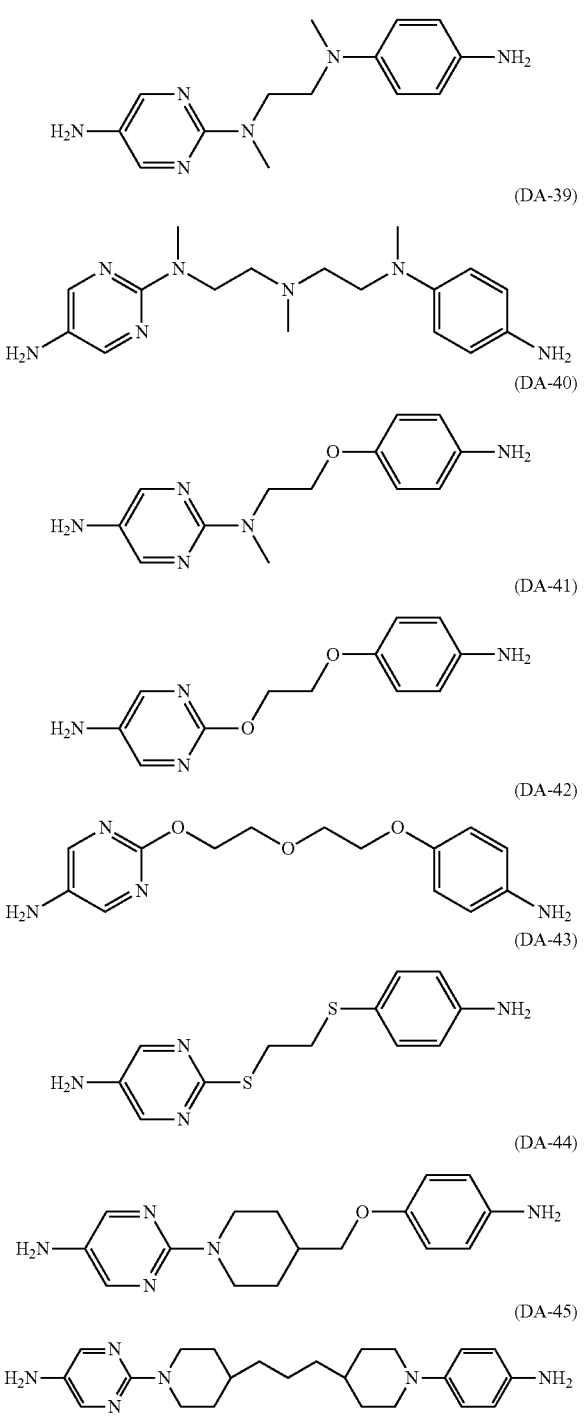

Among these, regarding the specific diamine, compounds represented by Formula (DA-1) to Formula (DA-13) and Formula (DA-30) to Formula (DA-37) are preferable, and compounds represented by Formula (DA-1) to Formula (DA-12) are particularly preferable. Here, one type of specific diamine can be used alone or two or more thereof can be used in combination.

When the polyamic acid (P) is synthesized, only a specific diamine may be used as a diamine compound, or a diamine other than a specific diamine may be used together with the specific diamine. The other diamine is not particularly limited as long as it does not have a group represented by Formula (4), and examples thereof include an aliphatic diamine, an alicyclic diamine, an aromatic diamine and a diamino organosiloxane. Regarding specific examples thereof, as an aliphatic diamine, for example, metaxylylenediamine, ethylenediamine, 1,3-propanediamine, tetramethylenediamine, and hexamethylenediamine; as an alicyclic diamine, for example, p-cyclohexanediamine, and 4,4'-methylenebis(cyclohexylamine);

as an aromatic diamine, for example, a side chain type diamine such as dodecanoxy diaminobenzene, hexadecanoxy diaminobenzene, octadecanoxy diaminobenzene, cholestanyloxy diaminobenzene, cholesteryloxy diaminobenzene, cholestanyl diaminobenzoate, cholesteryl diaminobenzoate, lanostanyl diaminobenzoate, 3,6-bis(4-aminobenzoyloxy)cholestane, 3,6-bis(4-aminophenoxy)cholestane, 1,1-bis(4-((aminophenyl)methyl)phenyl)-4-butylcyclohexane, 2,5-diamino-N,N-diallylaniline, and a compound represented by the following Formula (E-1)

[Chem.14]

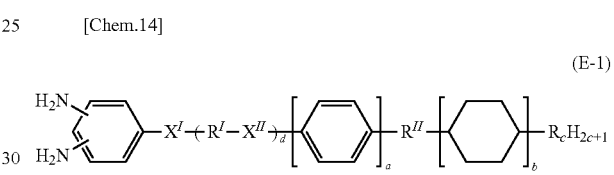

(E-1)

(in Formula (E-1), $X^I$ and $X^{II}$ each are independently a single bond, —O—, —COO— or —OCO—, $R^I$ is an alkanediyl group having 1 to 3 carbon atoms, $R^{II}$ is a single bond or an alkanediyl group having 1 to 3 carbon atoms, a is 0 or 1, b is an integer of 0 to 2, c is an integer of 1 to 20, and d is 0 or 1, here, a and b are not both 0)

a non-side chain type diamine such as paraphenylenediamine, 4,4'-diaminodiphenylmethane, 4,4'-ethylenedianiline, 4,4'-diaminodiphenylamine, 4,4'-diaminodiphenyl sulfide, 4-aminophenyl-4'-aminobenzoate, 4,4'-diaminoazobenzene, 3,5-diaminobenzoic acid, 1,2-bis(4-aminophenoxy)ethane, 1,5-bis(4-aminophenoxy)pentane, N,N'-di(4-aminophenyl)-N,N'-dimethylethylenediamine, bis[2-(4-aminophenyl)ethyl]hexanedioic acid, bis(4-aminophenyl)amine, N,N-bis(4-aminophenyl)methylamine, 1,4-bis(4-aminophenyl)-piperazine, N,N'-bis(4-aminophenyl)-benzidine, 2,2'-dimethyl-4,4'-diaminobiphenyl, 2,2'-bis(trifluoromethyl)-4,4'-diaminobiphenyl, 4,4'-diaminodiphenylether, 2,2-bis[4-(4-aminophenoxy)phenyl]propane, 4,4'-(phenylenediisopropylidene)bisaniline, 1,4-bis(4-aminophenoxy)benzene, 4-(4-aminophenoxycarbonyl)-1-(4-aminophenyl)piperidine, 4,4'-[4,4'-propane-1,3-diylbis(piperidine-1,4-diyl)]dianiline, 4-(4-methyl-1-piperazinyl)aniline, N,N'-bis(4-aminophenyl)-N,N'-dimethylbiphenyl-4,4'-diamine, and 1,4-phenylene bis(4-aminobenzoate); and as a diamino organosiloxane, for example, 1,3-bis(3-aminopropyl)-tetramethyldisiloxane; may be exemplified, and also a diamine compound described in Japanese Unexamined Patent Application Publication No. 2010-97188 can be used.

The other diamine used when the polyamic acid (P) is synthesized preferably has at least one selected from the group consisting of 1,2-bis(4-aminophenoxy)ethane, O,O'-di(4-aminophenyl)-ethylene glycol, 4-(4-methyl-1-piperazinyl)aniline and N,N'-di(4-aminophenyl)-N,N'-dimethylethylenediamine because it is then possible to obtain a liquid crystal element in which fewer micro bright spots occur even after it is driven for a long time, and preferably has at least one selected from the group consisting of paraphenylenediamine, 1,4-bis(4-aminophenyl)-piperazine, and 2,2'-dimethyl-4,4'-diaminobiphenyl because it is then possible to obtain a liquid crystal element having favorable liquid crystal alignment properties and AC afterimage characteristics. Here, when the polyamic acid (P) is synthesized, one type of other diamine can be used alone or two or more thereof can be used in combination.

A proportion of a specific diamine used is preferably 20 mol % or more, more preferably 40 mol % or more, and most preferably 60 mol % or more with respect to a total amount of a diamine compound used when the polyamic acid (P) is synthesized because it is then possible to obtain sufficient effects of the present disclosure.

(Synthesis of Polyamic Acid)

The polyamic acid (P) can be obtained by reacting the tetracarboxylic dianhydride with the diamine compound described above, and a molecular weight adjusting agent (for example, an acid monoanhydride, a monoamine compound, and a monoisocyanate compound) as necessary. A use ratio between the tetracarboxylic dianhydride and the diamine compound provided for the synthesis reaction of the polyamic acid (P) is preferably that with which a proportion of acid anhydride groups of the tetracarboxylic dianhydride is 0.2 to 2 equivalents with respect to 1 equivalent of amino groups of the diamine compound.

The synthesis reaction of the polyamic acid (P) preferably occurs in an organic solvent. In this case, the reaction temperature is preferably −20° C. to 150° C., and the reaction time is preferably 0.1 to 24 hours. Examples of the organic solvent used for the reaction include an aprotic polar solvent, a phenolic solvent, an alcohol, ketone, ester, ether, halogenated hydrocarbon, and hydrocarbon. Regarding a particularly preferable organic solvent, at least one solvent selected from the group consisting of N-methyl-2-pyrrolidone, N,N-dimethylacetamide, N,N-dimethylformamide, dimethyl sulfoxide, γ-butyrolactone, tetramethylurea, hexamethylphosphortriamide, m-cresol, xylenol and halogenated phenols is used, or at least one thereof and another organic solvent (for example, butyl cellosolve and diethylene glycol diethyl ether) are used in a mixture. Regarding a preferable amount of an organic solvent used, a total amount of the tetracarboxylic dianhydride and the diamine compound is 0.1 to 50 mass % with respect to a total amount of the reaction solution. The reaction solution in which the polyamic acid (P) is dissolved may be directly used to prepare a liquid crystal aligning agent or the polyamic acid (P) contained in the reaction solution may be isolated and then used to prepare a liquid crystal aligning agent.

(Polyamic Acid Ester)

When the polymer (P) is a polyamic acid ester, the polyamic acid ester has a structural unit in which at least one of $R^5$ and $R^6$ in the partial structure represented by Formula (1) is a monovalent organic group having 1 to 6 carbon atoms. The polyamic acid ester can be obtained by, for example, [I] a method in which the polyamic acid (P) obtained above is reacted with an esterifying agent (for example, methanol, ethanol, and N,N-dimethylformamide diethyl acetal), [II] a method in which a tetracarboxylic acid diester including a tetracarboxylic acid diester having a partial structure represented by Formula (3) is reacted with a diamine compound containing a specific diamine, preferably in an organic solvent, and in the presence of an appropriate dehydration catalyst (for example, 4-(4,6-dimethoxy-1,3,5-triazin-2-yl)-4-methylmorpholinium halide, carbonyl imidazole, and a phosphorus condensation agent), [III] a method in which a tetracarboxylic acid diester dihalide including a tetracarboxylic acid diester dihalide having a partial structure represented by Formula (3) is reacted with a diamine compound containing a specific diamine, preferably in an organic solvent, and in the presence of an appropriate base (for example, tertiary amines such as pyridine and trimethylamine, and those containing alkali metals such as sodium or potassium such as sodium hydride, potassium hydride, sodium hydroxide, potassium hydroxide), or the like.

The tetracarboxylic acid diester used in the above [II] can be obtained by ring opening of a specific acid dianhydride or other tetracarboxylic dianhydrides using alcohols or the like. The tetracarboxylic acid diester dihalide used in the above [III] can be obtained by reacting the tetracarboxylic acid di ester obtained above with an appropriate chlorinating agent such as thionyl chloride.

The polyamic acid ester may have only an amic acid ester structure or may be a partially esterified product in which an amic acid structure and an amic acid ester structure are included together. Here, when a polyamic acid ester is obtained as a solution according to the reaction, the solution may be directly used to prepare a liquid crystal aligning agent or the polyamic acid ester contained in the reaction solution may be isolated and then used to prepare a liquid crystal aligning agent.

(Polyimide)

When the polymer (P) is a polyimide, the polyimide (hereinafter referred to as a "polyimide (P)") has a partial structure represented by Formula (2). The polyimide (P) can be obtained by, for example, when the polyamic acid (P) synthesized above is imidized by dehydrating and ring-closing. The polyimide (P) may be a completely imidized product in which all of amic acid structures included in the polyamic acid (P) which is a precursor thereof are subjected to dehydration and ring-closing or a partially imidized product in which only some of amic acid structures are subjected to dehydration and ring-closing, and the amic acid structure and the imide ring structure are present together. The imidization rate of the polyimide (P) is preferably 40 to 100% and more preferably 60 to 90%. The imidization rate is a percentage of a proportion of the number of imide ring structures with respect to a total of the number of amic acid structures and the number of imide ring structures in the polyimide. Here, a part of the imide rings may be an isoimide ring.

The dehydration and ring-closing of the polyamic acid (P) are preferably performed by a method in which a polyamic acid is dissolved in an organic solvent, a dehydrating agent and a dehydration and ring-closing catalyst are added to the solution, and as necessary, heating is performed. Regarding the dehydrating agent, for example, an acid anhydride such as acetic anhydride, propionic anhydride, and trifluoroacetic anhydride, can be used. An amount of a dehydrating agent used is preferably 0.01 to 20 mol with respect to 1 mol of an amic acid structure of the polyamic acid. Regarding the dehydration and ring-closing catalyst, for example, tertiary amines such as pyridine, collidine, lutidine, and trimethylamine can be used. An amount of a dehydration and ring-closing catalyst used is preferably 0.01 to 10 mol with respect to 1 mol of a dehydrating agent used. Regarding an organic solvent to be used, the organic solvent used for synthesis of the polyamic acid (P) may be exemplified. The reaction temperature of the dehydration and ring-closing reaction is preferably 0 to 180° C., and the reaction time is preferably 1.0 to 120 hours. The reaction solution containing a polyimide (P) obtained in this manner may be directly used to prepare a liquid crystal aligning agent or the polyimide (P) may be isolated and then used to prepare a liquid crystal aligning agent.

Regarding the solution viscosity of the polymer (P), a solution with a concentration of 10 mass % preferably has a solution viscosity of 10 to 800 mPa·s and more preferably has a solution viscosity of 15 to 500 mPa·s. Here, the solution viscosity (mPa·s) is a value measured at 25° C. using an E type rotational viscometer for a polymer solution with a concentration of 10 mass % prepared using a good solvent (for example γ-butyrolactone, and N-methyl-2-pyrrolidone) for the polymer (P).

The weight average molecular weight (Mw) of the polymer (P) in terms of polystyrene measured through gel permeation chromatography (GPC) is preferably 1,000 to 500,000 and more preferably 5,000 to 100,000. A molecular weight distribution (Mw/Mn) represented by a ratio of Mw to the number average molecular weight (Mn) in terms of polystyrene measured through GPC is preferably 15 or less and more preferably 10 or less. Here, regarding the polymer (P) contained in the liquid crystal aligning agent, only one type may be used or two or more thereof may be used in combination.

<<Other Components>>

The liquid crystal aligning agent of the present disclosure may contain components other than the polymer (P). Examples of the other components include a polymer having neither a partial structure represented by Formula (1) or a partial structure represented by Formula (2) (hereinafter referred to as "other polymers"), a compound having at least one epoxy group in a molecule, a functional silane compound, an antioxidant, a metal chelate compound, a curing accelerator, a surfactant, a filler, a dispersant, a photosensitizer, an acid generating agent, a base generating agent, and a radical generating agent. Proportions of contained components can be appropriately selected according to the compounds as long as the effects of the present disclosure are not impaired.

In the liquid crystal aligning agent, other polymers are preferably contained because it is then possible to reduce the occurrence of micro bright spots even after a liquid crystal element is driven for a long time. A main framework of the other polymers is not particularly limited, and polymers including, for example, polyamic acid, polyimide, polyamic acid ester, polyorganosiloxane, polyester, a cellulose derivative, polyacetal, a polystyrene derivative, a poly(styrene-phenylmaleimide) derivative, or poly(meth)acrylate, as a main framework may be exemplified. Among these, the other polymers are preferably at least one selected from the group consisting of a polyamic acid, a polyamic acid ester and a polyimide because it is then possible to suitably reduce the occurrence of micro bright spots.

When the other polymers are added to the liquid crystal aligning agent, a proportion thereof is preferably 1 to 90 mass %, more preferably 10 to 80 mass %, and most preferably 20 to 70 mass % with respect to a total amount of polymers in the liquid crystal aligning agent.

<Solvent>

The liquid crystal aligning agent of the present disclosure is prepared as a liquid composition in which the polymer (P) and other components that are used as necessary are preferably dispersed or dissolved in an appropriate solvent.

Examples of the organic solvent used include N-methyl-2-pyrrolidone, N-ethyl-2-pyrrolidone, 1,2-dimethyl-2-imidazolidinone, γ-butyrolactone, γ-butyrolactam, N,N-dimethylformamide, N,N-dimethylacetamide, 4-hydroxy-4-methyl-2-pentanone, ethylene glycol monomethyl ether, butyl lactate, butyl acetate, methyl methoxy propionate, ethyl ethoxy propionate, ethylene glycol methyl ether, ethylene glycol ethyl ether, ethylene glycol-n-propyl ether, ethylene glycol-i-propyl ether, ethylene glycol-n-butyl ether (butyl cellosolve), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol mono methyl ether acetate, diethylene glycol monoethyl ether acetate, diisobutyl ketone, isoamyl propionate, isoamyl isobutyrate, diisopentyl ether, ethylene carbonate, and propylene carbonate. These may be used alone or two or more thereof may be used in combination.

A concentration of the solid content (a ratio of the total mass of components other than the solvent for the liquid crystal aligning agent with respect to the total mass of the liquid crystal aligning agent) in the liquid crystal aligning agent is appropriately selected in consideration of the viscosity, the volatility, and the like, and is preferably in a range of 1 to 10 mass %. That is, the liquid crystal aligning agent is applied to the surface of the substrate as will be described below, and is preferably heated and thus a coating film which is a liquid crystal alignment film or a coating film which becomes a liquid crystal alignment film is formed. In this case, when the concentration of the solid content is less than 1 mass %, the film thickness of the coating film becomes too small, and it is difficult to obtain a favorable liquid crystal alignment film. On the other hand, when the concentration of the solid content exceeds 10 mass %, the film thickness of the coating film becomes too large and it is difficult to obtain a favorable liquid crystal alignment film, and the viscosity of the liquid crystal aligning agent increases and coating properties tend to deteriorate.

The content of the polymer (P) in the liquid crystal aligning agent is preferably 10 parts by mass or more, more preferably 20 parts by mass or more, and most preferably 30 parts by mass or more with respect to a total of 100 parts by mass of solid components (components other than the solvent) in the liquid crystal aligning agent.

<<Liquid Crystal Alignment Film and Liquid Crystal Element>>

The liquid crystal alignment film of the present disclosure is formed using the liquid crystal aligning agent prepared as described above. In particular, the liquid crystal alignment film of the present disclosure is preferably produced using a method including a photo-alignment process in which a coating film is formed using the liquid crystal aligning agent and light is emitted to the coating film to impart a liquid crystal alignment ability.

In addition, the liquid crystal element of the present disclosure has a liquid crystal alignment film formed using the liquid crystal aligning agent described above. The liquid crystal operation mode in the liquid crystal element is not particularly limited, and various modes, for example, a twisted nematic (TN) type, a super twisted nematic (STN) type, a vertical alignment (VA) type (including a VA-MVA type and a VA-PVA type), an in-plane switching (IPS) type, a fringe field switching (FFS) type, and an optically compensated bend (OCB) type, can be applied. The liquid crystal element can be produced by, for example, a method including the following process 1 to process 3. In the process 1, a substrate used differs depending on a desired operation mode. In the process 2 and the process 3, operation modes are the same.

(Process 1: Formation of Coating Film)

First, a liquid crystal aligning agent is applied to a substrate and preferably a coated surface is heated to form a coating film on the substrate. Regarding the substrate, for example, a transparent substrate made of glass such as float glass and soda glass; or a plastic such as polyethylene terephthalate, polybutylene terephthalate, polyether sulfone, polycarbonate, and poly(alicyclic olefin) can be used. Regarding a transparent conductive film provided on one surface of the substrate, a NESA film (registered trademark of PPG, USA) made of tin oxide ($SnO_2$), an ITO film made of indium oxide-tin oxide ($In_2O_3$—$SnO_2$), or the like can be used. When a TN type, STN type or VA type liquid crystal element is produced, two substrates on which a patterned transparent conductive film is provided are used. On the other hand, when an IPS type or FFS type liquid crystal element is produced, a substrate on which an electrode made of a transparent conductive film or a metal film patterned in a comb shape is provided and an opposing substrate on which no electrode is provided are used. Regarding the metal film, for example, a film made of a metal such as chromium can be used. Application of the liquid crystal aligning agent to the substrate is performed on a surface on which an electrode is formed according to, preferably, an offset printing method, a flexographic printing method, a spin coating method, a roll coater method or an inkjet method.

After the liquid crystal aligning agent is applied, in order to prevent dripping of the applied liquid crystal aligning agent or the like, preheating (pre-bake) is preferably performed. The pre-baking temperature is preferably 30 to 200° C., and the pre-baking time is preferably 0.25 to 10 minutes. Then, the solvent is completely removed, and as necessary, a firing (post-baking) process is performed to thermally imidize an amic acid structure in the polymer. In this case, the firing temperature (post-baking temperature) is preferably 80 to 300° C., and the post-baking time is preferably 5 to 200 minutes. The film thickness of the film formed in this manner is preferably 0.001 to 1 µm. After the liquid crystal aligning agent is applied to the substrate, the organic solvent is removed, and a liquid crystal alignment film, or a coating film which becomes a liquid crystal alignment film is formed.

(Process 2: Alignment Treatment)

When a TN type, STN type, IPS type or FFS type liquid crystal element is produced, a treatment of imparting a liquid crystal alignment ability to the coating film formed in the process 1 (alignment treatment) is performed. Therefore, an alignment ability of liquid crystal molecules is imparted to the coating film to form a liquid crystal alignment film. Regarding the alignment treatment, since the polymer (P) has high light sensitivity and can cause anisotropy to be exhibited on a coating film even with a small light exposure amount, a photo-alignment treatment in which a liquid crystal alignment ability is imparted to a coating film by emitting light to the coating film formed on the substrate can be preferably used. On the other hand, when a vertically aligned liquid crystal element is produced, the coating film formed in the process 1 can be directly used as a liquid crystal alignment film, but an alignment treatment may be performed on the coating film.

Light emission in the photo-alignment treatment can be performed by a method in which light is emitted to a coating film after a post-baking process, a method in which light is emitted to a coating film after a pre-baking process and before a post-baking process, a method in which light is emitted to a coating film when the coating film is heated in at least one of a pre-baking process and a post-baking process, or the like. In the photo-alignment treatment, regarding light emitted to the coating film, for example, UV light and visible light including light with a wavelength of 150 to 800 nm can be used. Preferably, UV light including light with a wavelength of 200 to 400 nm is used. When emission light is polarized light, it may be linearly polarized light or partially polarized light. In addition, when emission light used is linearly polarized light or partially polarized light, light emission may be performed in a direction perpendicular to the surface of the substrate or in an oblique direction, or in a direction which is a combination thereof. When non-polarized light is emitted, a direction in which light is emitted is an oblique direction.

Regarding a light source to be used, for example, a low pressure mercury lamp, a high pressure mercury lamp, a deuterium lamp, a metal halide lamp, an argon resonance lamp, a xenon lamp, or an excimer laser can be used. An amount of light emitted is preferably 400 to 20,000 $J/m^2$ and more preferably 1,000 to 5,000 $J/m^2$. In order to improve the reactivity, emission of light to the coating film may be performed while the coating film is heated.

When the liquid crystal alignment film is produced, a contact process in which the coating film subjected to a light emission treatment is brought into contact with water, a water-soluble organic solvent, or a solvent in which water and a water-soluble organic solvent are mixed may be further included. Such a contact process is suitably performed because decomposition products generated according to the photo-alignment treatment can be removed from the film, and it is possible to reduce the occurrence of micro bright spots in the obtained liquid crystal element. Here, examples of the water-soluble organic solvent include methanol, ethanol, 1-propanol, isopropanol, 1-methoxy-2-propanol acetate, butyl cellosolve, ethyl lactate, acetone, methyl ethyl ketone, methyl isobutyl ketone, and cyclopentanone. Among these, the solvent used in the contact process is preferably, water, isopropanol or a mixture thereof.

Examples of a method in which a coating film is brought into contact with a solvent include a spraying treatment, a shower treatment, an immersion treatment, and a liquid filling treatment, and the method is not limited thereto. A time for which the coating film is in contact with the solvent is not particularly limited, and, for example, may be 5 seconds to 15 minutes. The temperature when the coating film is brought into contact with the solvent is, for example, 10 to 30° C.

When the liquid crystal alignment film is produced, a heating process in which the coating film subjected to a light emission treatment is heated in a temperature range of 120° C. or higher and 280° C. or lower in at least one of before the contact process and after the contact process may be additionally performed. Such a heating process is preferably performed because it is then possible to obtain a liquid crystal element in which liquid crystal alignment properties are further improved and an AC afterimage is further reduced.

The heating temperature in the heating process is preferably 140° C. or higher and more preferably 150° C. to 250° C. because it is then possible to promote realignment of molecular chains due to heating. The heating time is preferably 5 minutes to 200 minutes, and more preferably 10 minutes to 60 minutes.

(Process 3: Construction of Liquid Crystal Cell)

Two substrates on which the liquid crystal alignment film prepared as above is formed are prepared and a liquid crystal is disposed between the two substrates that are disposed to face each other and thereby a liquid crystal cell is produced. When a liquid crystal cell is produced, for example, (1) a method in which two substrates are disposed to face each other with a gap (spacer) therebetween so that liquid crystal alignment films face each other, peripheral parts of the two substrates are bonded using a sealing agent, a liquid crystal is injected and filled into a cell gap partitioned by the surface of the substrate and the sealing agent and an injection hole is then sealed, (2) a method (ODF method) in which a sealing agent is applied to a predetermined place on one substrate on which the liquid crystal alignment film is formed, and furthermore, a liquid crystal is added dropwise to predetermined places on the surface of the liquid crystal alignment film, and the other substrate is then bonded so that the liquid crystal alignment films face each other, and the liquid crystal is spread over the entire surface of the substrate, or the like is used. Desirably, the produced liquid crystal cell is additionally heated to a temperature at which the liquid crystal used is in an isotropic phase, and then slowly cooled to room temperature, and thus the flow alignment when the liquid crystal is filled in is removed.

Regarding the sealing agent, for example, a curing agent and an epoxy resin containing aluminum oxide spheres as a spacer can be used. Regarding the spacer, a photo spacer, a bead spacer, and the like can be used. Examples of the liquid crystal include a nematic liquid crystal and a smectic liquid crystal. Among these, a nematic liquid crystal is preferable. For example, a Schiff base liquid crystal, an azoxy liquid crystal, a biphenyl liquid crystal, a phenylcyclohexane liquid crystal, an ester liquid crystal, a terphenyl liquid crystal, a biphenyl cyclohexane liquid crystal, a pyrimidine liquid crystal, a dioxane liquid crystal, a bicyclo octane liquid crystal, and a cubane liquid crystal can be used. In addition, for example, a cholesteric liquid crystal, a chiral agent, a ferroelectric liquid crystal or the like may be added to such a liquid crystal and then used.

Next, a polarizing plate is bonded to the outer surface of the liquid crystal cell as necessary. Examples of the polarizing plate include a polarizing plate in which a polarizing film called an "H film" in which iodine is absorbed while a polyvinyl alcohol is stretched and aligned is inserted between cellulose acetate protective films and a polarizing plate made of an H film itself. Thereby, a liquid crystal element is obtained.

Here, the reason why a liquid crystal element having excellent AC afterimage characteristics and long-term heat resistance is obtained according to the liquid crystal aligning agent containing the polymer (P) is not clear, but it is speculated to be as follows. The polymer (P) has a nitrogen-containing heterocyclic ring to which a polymeric bonding group (amino group) and an electron donating group ($Y^1$ or $Y^2$) are bonded in the structural unit derived from a diamine. When light is emitted to the coating film containing such a polymer (P), it is speculated that photolysis due to a cyclobutane ring retro [2+2] reaction is promoted according to light-induced electron transfer (electron transfer sensitization reaction) from a diamine framework to a substituted cyclobutane ring according to an electron donating group and resonance stabilization (suppression of heat inactivation) in an excited state according to a nitrogen-containing heterocyclic ring. Thereby, it is speculated that a degree of alignment order of the liquid crystal of the obtained liquid crystal element can be improved, and as a result, the AC afterimage can be reduced. In addition, it is speculated that the water solubility of a photodegradable product is improved due to a nitrogen-containing heterocyclic ring that the polymer (P) has, and when the contact process is performed, a photodegradable product is easily removed in the same process, and the crystallinity of a photodegradable product is lowered due to an aliphatic structure that $X^2$ has, and thus a liquid crystal element in which the occurrence of micro bright spots is reduced even after driving is performed for a long time under high temperature conditions is obtained.

The liquid crystal element of the present disclosure can be effectively applied to various applications, and can be used for various display devices, for example, a clock, a portable game machine, a word processor, a laptop, a car navigation system, a camcorder, a PDA, a digital camera, a mobile phone, a smartphone, various monitors, a liquid crystal television, and an information display, and a light control film and the like. In addition, a liquid crystal element formed using the liquid crystal aligning agent of the present disclosure can be applied to a phase difference film.

EXAMPLES

While the present disclosure will be described below in further detail with reference to examples, the present disclosure is not limited to these examples.

Structures and abbreviations of main compounds used in the following examples are as follows.
(Specific Acid Dianhydrides)
TA-1: (1R,2R,3S,4S)-1,3-dimethylcyclobutane-1,2,3,4-tetracarboxylic dianhydride
(Other Tetracarboxylic Dianhydrides)
TB-2: 1,2,3,4-cyclobutane tetracarboxylic dianhydride
TB-3: 2,3,5-tricarboxycyclopentylacetic acid dianhydride
TB-4: 4,4'-oxydiphthalic anhydride
TB-5: 1,3-propylene glycol bis(anhydro trimellitate)

[Chem. 15]

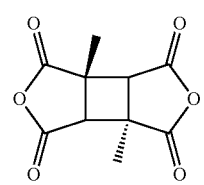

(TA-1)

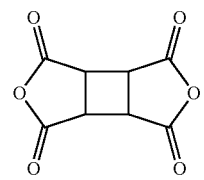

(TB-2)

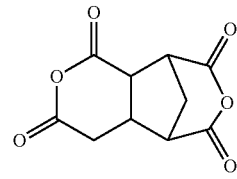

(TB-3)

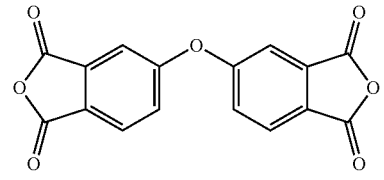

(TB-4)

-continued (TB-5)

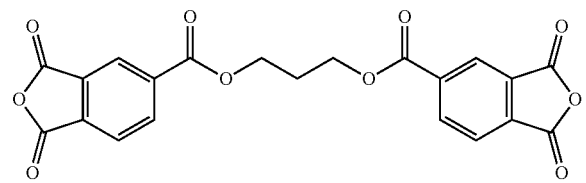

(Specific Diamines)
DA-1: N,N'-di(5-amino-2-pyridyl)-N,N'-dimethylethylenediamine
DA-2: N,N'-di(5-amino-2-pyridyl)-ethylenediamine
DA-3: N,N'-di(5-amino-2-pyridyl)-N,N'-di(tert-butoxycarbonyl)ethylenediamine
DA-4: N,N'-di(5-amino-2-pyridyl)-N,N'-dimethyl-1,3-propanediamine
DA-5: N,N'-di(5-amino-2-pyridyl)-N,N',N''-trimethyldiethylenetriamine
DA-6: N,O-di(5-amino-2-pyridyl)-N-methylethanolamine
DA-7: O,O'-di(5-amino-2-pyridyl)-ethylene glycol
DA-8: O,O'-di(5-amino-2-pyridyl)-1,5-propanediol
DA-9: O,O'-di(5-amino-2-pyridyl)-diethylene glycol
DA-10: S,S'-di(5-amino-2-pyridyl)-1,2-ethanedithiol
DA-11: N,O-di(5-amino-2-pyridyl)-4-piperidine methanol
DA-12: N,N'-di(5-amino-2-pyridyl)-1,3-di-4-piperidylpropane
DA-13: N,N'-di(5-amino-2-pyridyl)-piperazine
(Other Diamines)
DB-1: N,N'-di(4-aminophenyl)-N,N'-dimethylethylenediamine
DB-2: O,O'-di(4-aminophenyl)-ethylene glycol
DB-3: S,S'-di(4-aminophenyl)-1,2-ethanedithiol
DB-4: N,N'-di(4-aminophenyl)-piperazine
DB-5: paraphenylenediamine
DB-6: 2,2'-dimethyl-4,4'-diaminobiphenyl
DB-7: 444-methyl-1-piperazinyl)aniline
DB-8: N,N'-bis(4-aminophenyl)-N,N'-dimethylbiphenyl-4,4'-diamine
DB-9: 1,4-phenylene bis(4-aminobenzoate)

[Chem. 16]

(DA-1)
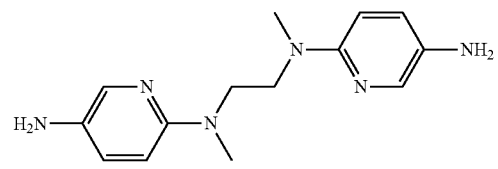

(DA-2)
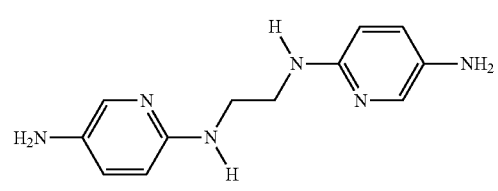

(DA-3)
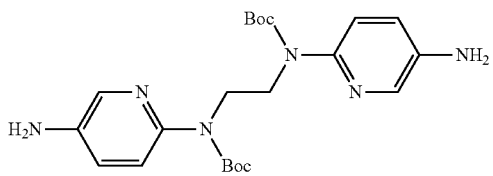

(DA-4)
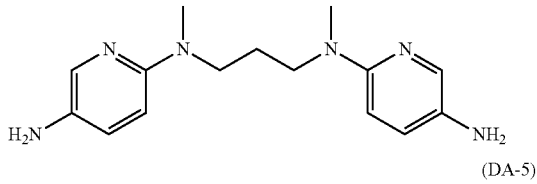

(DA-5)
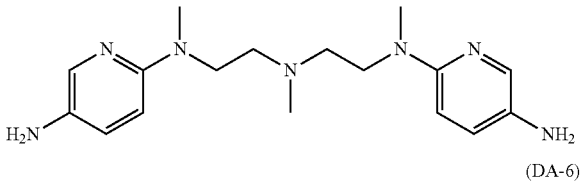

(DA-6)
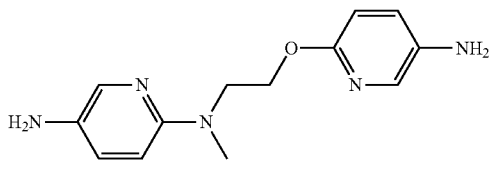

(DA-7)
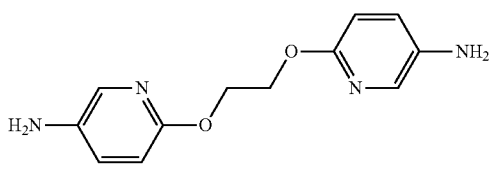

(DA-8)
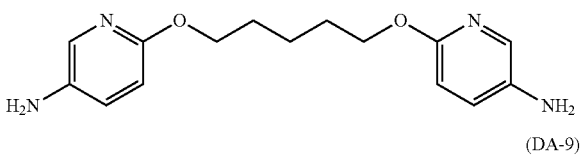

(DA-9)
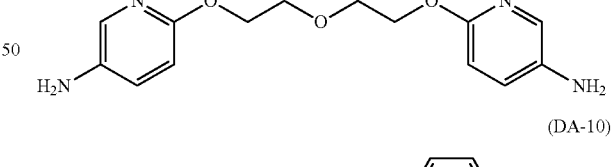

(DA-10)
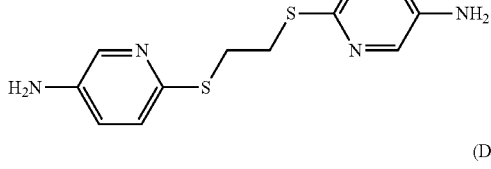

(DA-11)
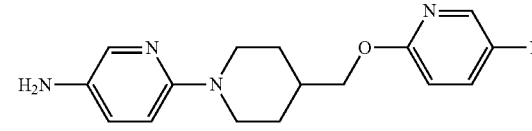

-continued (DA-12)
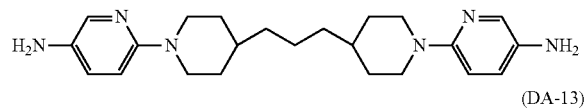

(DA-13)
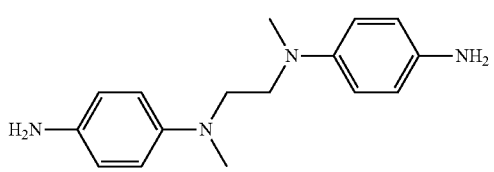

[Chem. 17]

(DB-1)
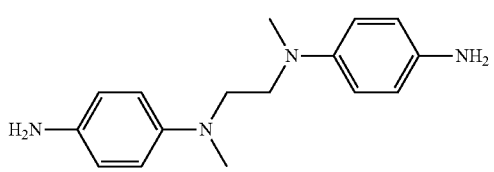

(DB-2)
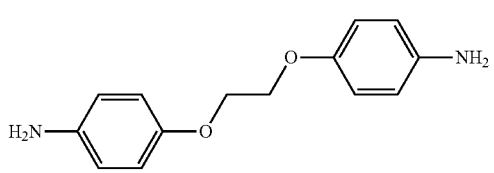

(DB-3)
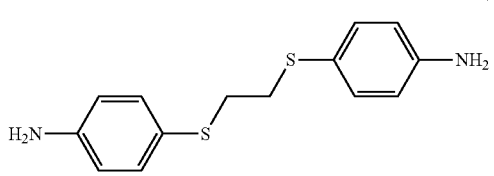

(DB-4)

(DB-5)
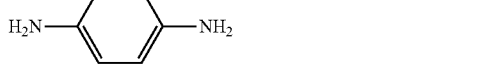

(DB-6)
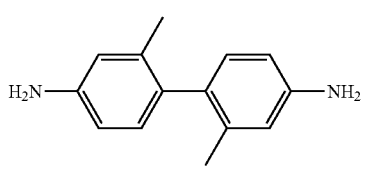

(DB-7)
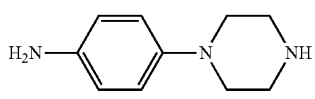

(DB-8)
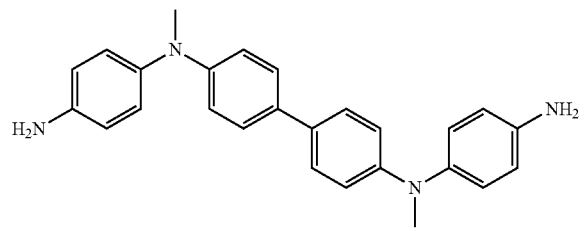

-continued (DB-9)
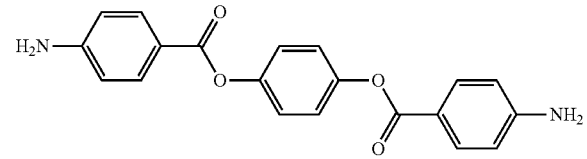

(Solvents)
NMP: N-methyl-2-pyrrolidone
γBL: γ-butyrolactone
BC: butyl cellosolve Synthesis of Compounds Synthesis Example 1

Potassium carbonate (34.55 g, 0.25 mol) was put into a 3-neck flask including a reflux tube and a nitrogen inlet tube and purging with nitrogen was performed, and N,N'-dimethylethylenediamine (8.82 g, 0.10 mol), and NMP (200 mL) were put thereinto. While stirring the reaction solution under nitrogen, 2-fluoro-5-nitropyridine (28.42 g, 0.20 mol) was slowly added dropwise thereto over about 20 minutes. When dropwise addition was ended, the temperature was raised to about 50° C. due to heat of reaction, and a yellowish brown precipitate was precipitated according to the reaction, and became suspended. The reaction solution was additionally stirred at 100° C. for 7 hours and the reaction was completed. After cooling, the reaction solution was poured into 200 mL of water and stirred to coagulate a product. 80 mL of ethyl acetate was added to this water coagulated dispersion solution and stirred at room temperature for 1 hour. The obtained dispersion solution was filtered and washed with water and ethyl acetate. The obtained precipitate was vacuum-dried at 60° C. for 8 hours, and thereby a yellowish brown powder nitro intermediate product (31.57 g, a yield of 95%) was obtained.

Next, 2.4 g of palladium carbon was put into a 3-neck flask including a reflux tube and a nitrogen inlet tube and purging with nitrogen was performed. 120 mL of tetrahydrofuran and 30 mL of ethanol degassed by bubbling nitrogen were put thereinto, a nitro intermediate product (9.97 g, 0.03 mol) was added thereto, and then stirred to obtain a suspension solution. 8.9 mL of hydrazine monohydrate was slowly added dropwise to the reaction solution at room temperature. After dropwise addition, the temperature was gradually raised to 60° C. and stirring was performed for 4 hours. The reaction solution was diluted by adding 100 mL of tetrahydrofuran, filtered through Celite, and then concentrated to obtain a viscous substance. The obtained viscous substance was recrystallized in water and vacuum-dried to obtain a pink powder diamine (DA-1) (6.86 g, a yield of 84%). FIG. 1 shows measurement results of a $^1$H-NMR spectrum (DMSO-d$^6$, 400 MHz) of a diamine (DA-1).

[Chem. 18]

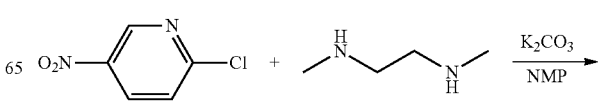

-continued

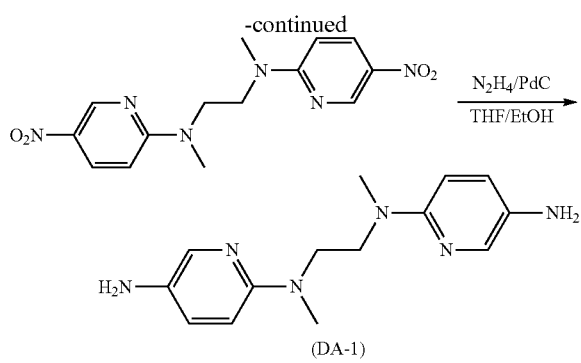

(DA-1)

Synthesis Example 2

A diamine (DA-2) was obtained in the same manner as in Synthesis Example 1 except that ethylenediamine was used in place of N,N'-dimethylethylenediamine.

Synthesis Example 3

The nitro intermediate product (3.04 g, 0.010 mol) obtained in Synthesis Example 2 and N,N-dimethyl-4-aminopyridine (0.24 g, 0.002 mol) were put into a 3-neck flask including a reflux tube and a nitrogen inlet tube, purging with nitrogen was performed, and tetrahydrofuran (60 mL) was put thereinto. The reaction solution was heated to 50° C., and a solution in which di-tert-butyl Bicarbonate (5.24 g, 0.024 mol) and tetrahydrofuran (5 mL) were mixed was added dropwise thereto and reacted for 24 hours. The reaction solution was concentrated under a reduced pressure, and then the obtained precipitate was recrystallized in toluene and vacuum-dried to obtain a yellow solid Boc-protected nitro intermediate product (4.04 g, a yield of 80%).

The obtained Boc-protected nitro intermediate product was subjected to a reduction reaction in the same manner as in Synthesis Example 1 to obtain a pink powder diamine (DA-3).

Synthesis Example 4

A diamine (DA-4) was obtained in the same manner as in Synthesis Example 1 except that N,N'-dimethyl-1,3-propanediamine was used in place of N,N'-dimethylethylenediamine.

Synthesis Example 5

A diamine (DA-5) was obtained in the same manner as in Synthesis Example 1 except that N,N',N'-trimethyldiethylenetriamine was used in place of N,N'-dimethylethylenediamine.

Synthesis Example 6

A diamine (DA-6) was obtained in the same manner as in Synthesis Example 1 except that N-methylethanolamine was used in place of N,N'-dimethylethylenediamine.

Synthesis Example 7

A diamine (DA-7) was obtained in the same manner as in Synthesis Example 1 except that ethylene glycol was used in place of N,N'-dimethylethylenediamine.

Synthesis Example 8

A diamine (DA-8) was obtained in the same manner as in Synthesis Example 1 except that 1,5-propanediol was used in place of N,N'-dimethylethylenediamine.

Synthesis Example 9

A diamine (DA-9) was obtained in the same manner as in Synthesis Example 1 except that diethylene glycol was used in place of N,N'-dimethylethylenediamine.

Synthesis Example 10

A diamine (DA-10) was obtained in the same manner as in Synthesis Example 1 except that 1,2-ethanedithiol was used in place of N,N'-dimethylethylenediamine.

Synthesis Example 11

A diamine (DA-11) was obtained in the same manner as in Synthesis Example 1 except that 4-piperidinemethanol was used in place of N,N'-dimethylethylenediamine.

Synthesis Example 12

A diamine (DA-12) was obtained in the same manner as in Synthesis Example 1 except that 1,3-di-4-piperidylpropane was used in place of N,N'-dimethylethylenediamine.

Synthesis Example 13

A diamine (DA-13) was obtained in the same manner as in Synthesis Example 1 except that piperazine was used in place of N,N'-dimethylethylenediamine.

Synthesis of Polymer

Synthesis Example 14

The diamine (DA-1) was dissolved in NMP, and 0.95 equivalents of tetracarboxylic dianhydride (TA-1) was added thereto, and reacted at room temperature for 6 hours, and thereby a solution containing 15 mass % of a polyamic acid (PA-1) having a structural unit represented by the following Formula (PA-1) was obtained.

[Chem. 19]

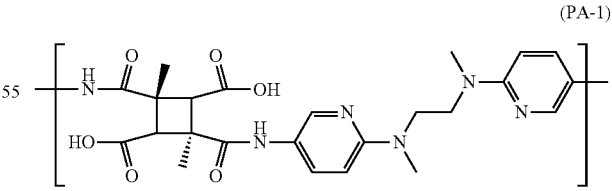

(PA-1)

Synthesis Examples 15 to 36

Polyamic acids (PA-2 to PA-23) were obtained in the same manner as in Synthesis Example 14 except that the type and the molar ratio of tetracarboxylic dianhydride and diamine were changed as in the following Table 1.

Synthesis Example 37

A solution containing 15 mass % of the polyamic acid (PA-1) obtained in Synthesis Example 14 was diluted to 10 mass % with NMP, 0.8 equivalents of 1-methylpiperidine and acetic anhydride were added to the amide group of the polyamic acid (PA-1), and the mixture was heated and stirred at 60° C. for 3 hours. The obtained solution was repeatedly subjected to concentration under a reduced pressure and dilution with NMP, and a solution containing 15 mass % of a polyimide (PI-1) having a structural unit represented by the following Formula (PI-1) was obtained. A $^1$H-NMR spectrum (DMSO-$d^6$, 400 MHz) of the polyimide (PI-1) was measured, and an imidization rate was calculated by an integration ratio between an aromatic proton (66.0 to 9.0 ppm), a main chain amide proton (69.8 to 10.3 ppm), and an acetyl terminal amide proton (69.6 to 9.8 ppm), and the imidization rate was 80%.

[Chem. 20]

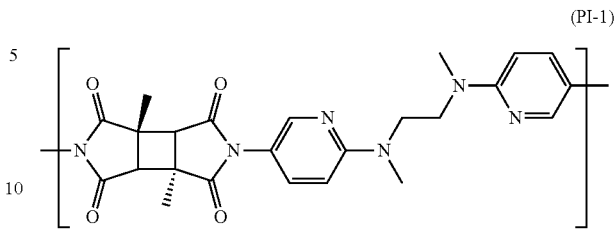

(PI-1)

Synthesis Examples 38 and 39

Polyimides (PI-2) and (PI-3) were obtained in the same manner as in Synthesis Example 37 except that a polyamic acid (PA-19) or a polyamic acid (PA-20) was used in place of the polyamic acid (PA-1).

TABLE 1

| | Polymer Type | Tetracarboxylic dianhydride | | | | Diamine compound | | | |
|---|---|---|---|---|---|---|---|---|---|
| | | Type | Molar ratio | Type | Molar ratio | Type | Molar ratio | Type | Molar ratio |
| Synthesis Example 14 | (PA-1) | (TA-1) | 100 | — | — | (DA-1) | 100 | — | — |
| Synthesis Example 15 | (PA-2) | (TA-1) | 100 | — | — | (DA-2) | 100 | — | — |
| Synthesis Example 16 | (PA-3) | (TA-1) | 100 | — | — | (DA-3) | 100 | — | — |
| Synthesis Example 17 | (PA-4) | (TA-1) | 100 | — | — | (DA-4) | 100 | — | — |
| Synthesis Example 18 | (PA-5) | (TA-1) | 100 | — | — | (DA-5) | 100 | — | — |
| Synthesis Example 19 | (PA-6) | (TA-1) | 100 | — | — | (DA-6) | 100 | — | — |
| Synthesis Example 20 | (PA-7) | (TA-1) | 100 | — | — | (DA-7) | 100 | — | — |
| Synthesis Example 21 | (PA-8) | (TA-1) | 100 | — | — | (DA-8) | 100 | — | — |
| Synthesis Example 22 | (PA-9) | (TA-1) | 100 | — | — | (DA-9) | 100 | — | — |
| Synthesis Example 23 | (PA-10) | (TA-1) | 100 | — | — | (DA-10) | 100 | — | — |
| Synthesis Example 24 | (PA-11) | (TA-1) | 100 | — | — | (DA-11) | 100 | — | — |
| Synthesis Example 25 | (PA-12) | (TA-1) | 100 | — | — | (DA-12) | 100 | — | — |
| Synthesis Example 26 | (PA-13) | (TA-1) | 100 | — | — | (DA-13) | 100 | — | — |
| Synthesis Example 27 | (PA-14) | (TA-1) | 100 | — | — | (DB-1) | 100 | — | — |
| Synthesis Example 28 | (PA-15) | (TA-1) | 100 | — | — | (DB-2) | 100 | — | — |
| Synthesis Example 29 | (PA-16) | (TA-1) | 100 | — | — | (DB-3) | 100 | — | — |
| Synthesis Example 30 | (PA-17) | (TA-1) | 100 | — | — | (DB-4) | 100 | — | — |
| Synthesis Example 31 | (PA-18) | (TA-1) | 100 | — | — | (DB-5) | 100 | — | — |
| Synthesis Example 32 | (PA-19) | (TA-1) | 100 | — | — | (DA-1) | 60 | (DA-4) | 40 |
| Synthesis Example 33 | (PA-20) | (TA-1) | 100 | — | — | (DA-1) | 60 | (DB-5) | 40 |
| Synthesis Example 34 | (PA-21) | (TA-1) | 80 | (TB-2) | 20 | (DA-1) | 100 | — | — |
| Synthesis Example 35 | (PA-22) | (TB-2) | 100 | — | — | (DA-1) | 100 | — | — |
| Synthesis Example 36 | (PA-23) | (TB-3) | 100 | — | — | (DA-13) | 100 | — | — |
| Synthesis Example 37 | (PI-1) | (TA-1) | 100 | — | — | (DA-1) | 100 | — | — |
| Synthesis Example 38 | (PI-2) | (TA-1) | 100 | — | — | (DA-1) | 60 | (DA-4) | 40 |

TABLE 1-continued

| | Polymer Type | Tetracarboxylic dianhydride | | | | Diamine compound | | | |
|---|---|---|---|---|---|---|---|---|---|
| | | Type | Molar ratio | Type | Molar ratio | Type | Molar ratio | Type | Molar ratio |
| Synthesis Example 39 | (PI-3) | (TA-1) | 100 | — | — | (DA-1) | 60 | (DB-5) | 40 |

Example 1: Photo-Alignment FFS Type Liquid Crystal Display Element (1) Preparation of Liquid Crystal Aligning Agent A solution of the polyamic acid (PA-1) obtained in Synthesis Example 14 was diluted with NMP and BC to obtain a solution having a solid content concentration of 4.0 mass % and a solvent composition ratio of NMP:BC=80:20 (mass ratio). This solution was filtered through a filter with a pore size of 0.2 μm to prepare a liquid crystal aligning agent (R-1).

(2) Formation of Liquid Crystal Alignment Film According to Photo-Alignment Method The liquid crystal aligning agent (R-1) prepared in the above (1) was applied using a spinner to respective surfaces of a glass substrate in which a flat plate electrode, an insulating layer and a comb-like electrode were laminated in this order on one surface, and an opposing glass substrate on which no electrode was provided, and heated on a hot plate at 80° C. for 1 minute, and then dried in an oven of which the inside was purged with nitrogen at 230° C. for 30 minutes, and thereby a coating film with an average film thickness of 0.1 μm was formed. A photo-alignment treatment was performed by emitting 1,000 J/m$^2$ of UV light including a linearly polarized light emission line of 254 nm to the surface of the coating film using a Hg—Xe lamp in a direction normal to the substrate. The coating film subjected to the photo-alignment treatment was immersed in a solution in which water and isopropanol were mixed at a volume ratio of 50:50 for 10 minutes for washing and then heated in a clean oven at 230° C. for 30 minutes for a heat treatment, and thereby a liquid crystal alignment film was formed.

(3) Production of Liquid Crystal Display Element

Regarding a pair of substrates having the liquid crystal alignment film produced in the above (2), a liquid crystal inlet at the edge of the surface on which the liquid crystal alignment film was formed was left, an epoxy resin adhesive containing aluminum oxide spheres with a diameter of 5.5 μm was applied by screen printing, and the substrates were then superimposed and compressed so that directions of polarization axes during light emission projected to the surfaces of the substrates were antiparallel, and the adhesive was thermally cured at 150° C. for 1 hour. Next, a nematic liquid crystal (MLC-7028 commercially available from Merck) was filled between the pair of substrates through the liquid crystal inlet, and the liquid crystal inlet was then sealed using an epoxy adhesive. In addition, in order to remove the flow alignment when the liquid crystal was injected, heating was performed at 120° C. and cooling was then gradually performed to room temperature. Next, polarizing plates were bonded to both outer surfaces of the substrate and thereby an FFS type liquid crystal display element was produced.

(4) Evaluation of Photoreactivity

The liquid crystal aligning agent (R-1) prepared in the above (1) was applied to a quartz substrate using a spinner, and heated on a hot plate at 80° C. for 1 minute, and was then dried in an oven of which the inside was purged with nitrogen at 230° C. for 30 minutes, and thereby a coating film with an average film thickness of 0.1 μm was formed. 1,000 J/m$^2$ of UV light including a linearly polarized light emission line of 254 nm was emitted to the surface of the coating film using a Hg—Xe lamp in a direction normal to the substrate. The photoreactivity was evaluated from the absorption derived from a substituted maleimide compound generated due to photolysis. Specifically, the absorbance of the coating film after light with a maximal absorption wavelength in a range of 220 to 250 nm was emitted was measured, and a rate of increase with respect to the absorbance of the coating film before light with the wavelength was emitted was calculated. When a rate of increase of the absorbance was 20% or more, this was evaluated as "very good," when a rate of increase of the absorbance was 10% or more and less than 20%, this was evaluated as "good," and when a rate of increase of the absorbance was less than 10%, this was evaluated as "poor." In the results, this example was evaluated as "very good."

(5) Evaluation of Liquid Crystal Alignment Properties

In the liquid crystal display element produced in the above (3), it was observed whether there was an abnormal domain in the change of bright and dark when a voltage of 5 V was turned ON or OFF (applied or released) under a microscope with a magnification of 50. When no abnormal domain was observed, this was evaluated as "good" and when an abnormal domain was observed, this was evaluated as "poor." In the results, this example was evaluated as "good."

(6) Evaluation of AC Afterimage Characteristics

An FFS type liquid crystal cell was produced in the same operation as in the above (3) except that no polarizing plates were bonded to both outer surfaces of the substrate. The FFS type liquid crystal cell was driven at an AC voltage of 10 V for 30 hours and a minimum relative transmittance (%) represented by the following Formula (2) was then measured using a device in which a polarizer and an analyzer were disposed between a light source and a light intensity detector.

$$\text{Minimum relative transmittance (\%)} = (\beta - B0)/(B100 - B0) \times 100 \quad (2)$$

(In Formula (2), B0 is a blank and an amount of light transmission under crossed nicols. B100 is a blank and an amount of light transmission under parallel nicols. β is an amount of light transmission that is minimized when a liquid crystal cell is interposed between a polarizer and an analyzer under crossed nicols.)

The black level in the dark state was represented by a minimum relative transmittance of the liquid crystal cell, and in the FFS type liquid crystal cell, a lower black level in the dark state indicated better contrast. When the minimum relative transmittance was less than 0.2%, this was evaluated as "very good," when the minimum relative transmittance was 0.2% or more and less than 0.5%, this was evaluated as "good," when the minimum relative transmittance was 0.5% or more and less than 1.0%, this was evaluated as "acceptable," and when the minimum relative transmittance was 1.0% or more, this was evaluated as "poor." In the results, this example was evaluated as "very good."

(7) Evaluation of Long-Term Heat Resistance (Micro Bright Spot Defects)

A liquid crystal cell was produced in the same operation as in the above (3) except that no polarizing plates were bonded to both outer surfaces of the substrate. The obtained liquid crystal cell was stored in a constant temperature chamber at 100° C. for 21 days and it was then observed whether there were micro bright spots in the liquid crystal cell under a microscope and thereby the micro bright spots were evaluated. It was found that, when decomposition products generated due to light emission for a photo-alignment treatment still remained in the film, if the liquid crystal display element was exposed under a high temperature environment for a long time, the decomposition products bled out on the surface of the film, and gradually crystallized in the liquid crystal, and were observed as micro bright spots. Here, the observation area was 680 μm×680 μm, and a microscope magnification was 100. When no micro bright spots were observed, this was evaluated as "very good," when the number of micro bright spots was 1 or more and 5 or less, this was evaluated as "good," when the number of micro bright spots was 6 or more and 10 or less, this was evaluated as "acceptable," and when the number of micro bright spots was 11 or more, this was evaluated as "poor." In the results, this example was evaluated as "good."

Examples 2 to 16, and Comparative Examples 1 to 6

Liquid crystal aligning agents were prepared, liquid crystal alignment films were formed, and FFS type liquid crystal display elements and liquid crystal cells were produced in the same manner as in Example 1 except that the polymer contained in the liquid crystal aligning agent in Example 1 was changed as shown in the following Table 2, and various evaluations were performed. The evaluation results are shown in the following Table 2.

Example 17

An FFS type liquid crystal display element and a liquid crystal cell were produced in the same manner as in Example 1 except that "(1) Preparation of liquid crystal aligning agent" and "(2) Formation of liquid crystal alignment film according to photo-alignment method" in Example 1 were changed as shown in the following (1a) and (2a), and various evaluations were performed. The evaluation results are shown in the following Table 2.

(1a) Preparation of Liquid Crystal Aligning Agent

A solution containing the polyimide (PI-1) obtained in Synthesis Example 37 as a polymer was diluted with NMP and BC to obtain a solution having a solid content concentration of 4.0 mass % and a solvent composition ratio of NMP:BC=80:20 (mass ratio). This solution was filtered through a filter with a pore size of 0.2 μm to prepare a liquid crystal aligning agent (R-17).

(2a) Formation of liquid crystal alignment film according to photo-alignment method The liquid crystal aligning agent (R-17) prepared in the above (1a) was applied using a spinner to respective surfaces of a glass substrate in which a flat plate electrode, an insulating layer and a comb-like electrode were laminated in this order on one surface, and an opposing glass substrate on which no electrode was provided so the film thickness was 0.1 μm, and dried on a hot plate at 80° C. for 1 minute, and thereby a coating film was formed. A photo-alignment treatment was performed by emitting 1,000 J/m$^2$ of UV light including a linearly polarized light emission line of 254 nm to the surface of the coating film using a Hg-Xe lamp in a direction normal to the substrate. The coating film subjected to the photo-alignment treatment was heated in an oven of which the inside was purged with nitrogen at 230° C. for 30 minutes for a heat treatment and then immersed in a solution in which water and isopropanol were mixed at a volume ratio of 50:50 for 10 minutes for washing and dried in a clean oven at 100° C., and thereby a liquid crystal alignment film was formed.

Examples 18 to 22

Liquid crystal aligning agents were prepared, liquid crystal alignment films were formed, and FFS type liquid crystal display elements and liquid crystal cells were produced in the same manner as in Example 17 except that the polymer contained in the liquid crystal aligning agent in Example 17 was changed as in the following Table 2, and various evaluations were performed. The evaluation results are shown in the following Table 2. Here, in Examples 20 to 22, two types of polymer (polymer 1 and polymer 2) were contained in the liquid crystal aligning agent at a formulation ratio of polymer 1:polymer 2=40:60 (a mass ratio in terms of solid content).

TABLE 2

|  | Liquid crystal aligning agent | | Liquid crystal alignment film | Liquid crystal cell | | |
| --- | --- | --- | --- | --- | --- | --- |
|  | Polymer 1 | Polymer 2 | Photoreactivity | Liquid crystal alignment properties | AC afterimage characteristics | Long-term heat resistance (micro bright spot defects) |
| Example 1 | (PA-1) | — | Very good | Good | Very good | Good |
| Example 2 | (PA-2) | — | Very good | Good | Very good | Good |
| Example 3 | (PA-3) | — | Very good | Good | Very good | Good |
| Example 4 | (PA-4) | — | Very good | Good | Good | Very good |
| Example 5 | (PA-5) | — | Very good | Good | Good | Good |
| Example 6 | (PA-6) | — | Very good | Good | Very good | Good |
| Example 7 | (PA-7) | — | Good | Good | Good | Good |
| Example 8 | (PA-8) | — | Good | Good | Good | Good |
| Example 9 | (PA-9) | — | Good | Good | Good | Good |
| Example 10 | (PA-10) | — | Very good | Good | Good | Good |
| Example 11 | (PA-11) | — | Very good | Good | Good | Very good |
| Example 12 | (PA-12) | — | Very good | Good | Good | Good |

TABLE 2-continued

|  | Liquid crystal aligning agent | | Liquid crystal alignment film | Liquid crystal cell | | |
|---|---|---|---|---|---|---|
|  | | | | Liquid crystal alignment properties | AC afterimage characteristics | Long-term heat resistance (micro bright spot defects) |
|  | Polymer 1 | Polymer 2 | Photoreactivity | | | |
| Example 13 | (PA-13) | — | Very good | Good | Very good | Acceptable |
| Example 14 | (PA-19) | — | Very good | Good | Very good | Very good |
| Example 15 | (PA-20) | — | Very good | Good | Very good | Very good |
| Example 16 | (PA-21) | — | Very good | Good | Very good | Very good |
| Example 17 | (PI-1) | — | Very good | Good | Very good | Good |
| Example 18 | (PI-2) | — | Very good | Good | Very good | Very good |
| Example 19 | (PI-3) | — | Very good | Good | Very good | Very good |
| Example 20 | (PI-1) | (PA-23) | — | Good | Very good | Very good |
| Example 21 | (PI-2) | (PA-23) | — | Good | Very good | Very good |
| Example 22 | (PI-3) | (PA-23) | — | Good | Very good | Very good |
| Comparative Example 1 | (PA-14) | — | Good | Good | Good | Poor |
| Comparative Example 2 | (PA-15) | — | Poor | Good | Acceptable | Poor |
| Comparative Example 3 | (PA-16) | — | Good | Good | Acceptable | Poor |
| Comparative Example 4 | (PA-17) | — | Good | Good | Good | Poor |
| Comparative Example 5 | (PA-18) | — | Poor | Poor | Poor | — |
| Comparative Example 6 | (PA-22) | — | Poor | Poor | Poor | — |

The photoreactivity of the liquid crystal alignment film was "very good" in all of Examples 1 to 6 and 10 to 19. The liquid crystal aligning agents of such example contained a polymer of 1,3-dimethyl-1,2,3,4-cyclobutanetetracarboxylic dianhydride and a diamine, the diamine had a pyridine ring to which a polymeric bonding group was bonded, and in the pyridine ring, a strong electron donating group such as an alkylamino group was bonded to the polymeric bonding group at the para position. A mechanism of high sensitivity with respect to light is not clear, but it is speculated that photolysis due to a substituted cyclobutane ring retro [2+2] reaction was promoted according to light-induced electron transfer (electron transfer sensitization reaction) from a diamine framework to a substituted cyclobutane ring according to an electron donating group and resonance stabilization (suppression of heat inactivation) in an excited state according to a pyridine ring. In addition, in Examples 7 to 9 in which the electron donating group bonded to a pyridine ring was an oxygen atom, the photoreactivities of the liquid crystal alignment film were all "good." In Examples 1 to 22, the liquid crystal alignment properties of the liquid crystal cell were all "good." In addition, in Examples 1 to 22, AC afterimage characteristics of the liquid crystal cell were all "very good" or "good." This is thought to have been caused by the fact that the photoreactivity of the liquid crystal alignment film was improved.

In Examples 1 to 12 and 14 to 22, the long-term heat resistances (reducing micro bright spot defects) of the liquid crystal cell were all "very good" or "good." These liquid crystal aligning agents contained a polymer having a structural unit derived from a diamine having a pyridine ring and a spacer structure. It was speculated that, when such a polymer was contained, water solubility of a photodegradable product was improved due to a pyridine ring, a photodegradable product was easily removed in the washing process, the crystallinity of the photodegradable product was lowered due to a spacer structure, and the occurrence of micro bright spots was reduced. In addition, in Example 13, the long-term heat resistance was evaluated as "acceptable," and the number of micro bright spots was relatively small although it was inferior to that of examples in which a diamine having a spacer structure was used.

In addition, in Examples 14 to 16 and 18 to 22, a polymer having a copolymer component of an acid dianhydride or a diamine was contained, or a plurality of types of polymer were contained. In these examples, it is speculated that the photodegradable product contained various chemical structures and inhibited crystallization of the photodegradable product, and the occurrence of micro bright spots was reduced. In addition, in Examples 20 to 22, it was speculated that, since a content of the polymer (polymer 1) that was decomposed by light was small, and an amount of the photodegradable product generated was small, the occurrence of micro bright spots was reduced.

On the other hand, in Comparative Examples 1 to 6 in which a polymer not having at least one of a partial structure derived from a substituted cyclobutane ring and a partial structure derived from a specific diamine was used, at least one of AC afterimage characteristics and the long-term heat resistance of the liquid crystal cell was "poor." Among these, in Comparative Examples 1 to 4 in which a polymer having no partial structure derived from a specific diamine was used, it was speculated that the water solubility of the photodegradable product was low, the photodegradable product was not easily removed in the washing process, and thus an amount of the photodegradable product remaining in the film increased, and micro bright spots were easily generated. In addition, in Comparative Examples 5 and 6, since liquid crystal alignment properties of the liquid crystal alignment film were "poor," it was not possible to evaluate the long-term heat resistance.

Synthesis Examples 40 to 44

Polyamic acids (PA-24 to PA-28) were obtained in the same manner as in Synthesis Example 14 except that the type and the molar ratio of tetracarboxylic dianhydride and diamine were changed as in the following Table 3.

Synthesis Examples 45 to 47

Polyimides (PI-4 to PI-6) were obtained in the same manner as in Synthesis Example 37 except that polyamic acids (PA-24 to PA-26) were used in place of the polyamic acid (PA-1).

TABLE 3

| | Polymer Type | Tetracarboxylic dianhydride | | Diamine compound | | | | | | | |
|---|---|---|---|---|---|---|---|---|---|---|---|
| | | Type | Molar ratio | Type | Molar ratio | Type | Molar ratio | Type | Molar ratio | Type | Molar ratio |
| Synthesis Example 40 | (PA-24) | (TA-1) | 100 | (DA-1) | 70 | (DB-6) | 30 | — | — | — | — |
| Synthesis Example 41 | (PA-25) | (TA-1) | 100 | (DA-1) | 60 | (DB-5) | 20 | (DB-6) | 20 | — | — |
| Synthesis Example 42 | (PA-26) | (TA-1) | 100 | (DA-1) | 50 | (DB-5) | 20 | (DB-6) | 20 | (DB-7) | 10 |
| Synthesis Example 43 | (PA-27) | (TB-4) | 100 | (DA-13) | 70 | (DB-8) | 30 | — | — | — | — |
| Synthesis Example 44 | (PA-28) | (TB-5) | 100 | (DB-9) | 100 | — | — | — | — | — | — |
| Synthesis Example 45 | (PI-4) | (TA-1) | 100 | (DA-1) | 70 | (DB-6) | 30 | — | — | — | — |
| Synthesis Example 46 | (PI-5) | (TA-1) | 100 | (DA-1) | 60 | (DB-5) | 20 | (DB-6) | 20 | — | — |
| Synthesis Example 47 | (PI-6) | (TA-1) | 100 | (DA-1) | 50 | (DB-5) | 20 | (DB-6) | 20 | (DB-7) | 10 |

Examples 23 to 25, and 29

Liquid crystal aligning agents were prepared, liquid crystal alignment films were formed, and FFS type liquid crystal display elements and liquid crystal cells were produced in the same manner as in Example 1 except that the polymer contained in the liquid crystal aligning agent in Example 1 was changed as shown in the following Table 4, and various evaluations were performed. The evaluation results are shown in the following Table 4. Here, in Example 29, two types of polymer (polymer 1 and polymer 2) were contained in the liquid crystal aligning agent at a formulation ratio of polymer 1:polymer 2=40:60 (a mass ratio in terms of solid content).

Examples 26 to 28, and 30 to 31 and Comparative Example 7

Liquid crystal aligning agents were prepared, liquid crystal alignment films were formed, and FFS type liquid crystal display elements and liquid crystal cells were produced in the same manner as in Example 17 except that the polymer contained in the liquid crystal aligning agent in Example 17 was changed as shown in the following Table 4, and various evaluations were performed. The evaluation results are shown in the following Table 4. Here, a formulation ratio when two types of polymer were contained in the liquid crystal aligning agent was polymer 1:polymer 2=40:60 (a mass ratio in terms of solid content) in Example 30, and polymer 1:polymer 2=80:20 (a mass ratio in terms of solid content) in Example 31.

TABLE 4

| | Liquid crystal aligning agent | | Liquid crystal alignment film | Liquid crystal cell | | |
|---|---|---|---|---|---|---|
| | | | | Liquid crystal alignment properties | AC afterimage characteristics | Long-term heat resistance (micro bright spot defects) |
| | Polymer 1 | Polymer 2 | Photoreactivity | | | |
| Example 23 | (PA-24) | — | Very good | Good | Very good | Very good |
| Example 24 | (PA-25) | — | Very good | Good | Very good | Very good |
| Example 25 | (PA-26) | — | Very good | Good | Very good | Very good |
| Example 26 | (PI-4) | — | Very good | Good | Very good | Very good |
| Example 27 | (PI-5) | — | Very good | Good | Very good | Very good |
| Example 28 | (PI-6) | — | Very good | Good | Very good | Very good |

TABLE 4-continued

| | Liquid crystal aligning agent | | Liquid crystal alignment film Photoreactivity | Liquid crystal cell | | |
|---|---|---|---|---|---|---|
| | | | | Liquid crystal alignment properties | AC afterimage characteristics | Long-term heat resistance (micro bright spot defects) |
| | Polymer 1 | Polymer 2 | | | | |
| Example 29 | (PA-24) | (PA-27) | — | Good | Acceptable | Very good |
| Example 30 | (PI-4) | (PA-27) | — | Good | Very good | Very good |
| Example 31 | (PI-4) | (PA-28) | — | Good | Very good | Very good |
| Comparative Example 7 | (PA-28) | — | Poor | Poor | Poor | — |

In Examples 23 to 28, the evaluation results of the liquid crystal alignment films and the liquid crystal cells were all "good" or "very good," and in Examples 29 to 31, the evaluation results of the liquid crystal cells were all "acceptable," "good" or "very good."

In addition, in Example 30, compared to Example 29 in which a polyamic acid was used in place of a polyimide as the polymer (P), the results of liquid crystal alignment properties and AC afterimage characteristics were good. This was thought to be caused by the fact that, in Example 30, the polymer (PI-4) was more likely to be unevenly distributed on the upper layer of the liquid crystal alignment film and better liquid crystal alignment properties and AC afterimage characteristics were obtained in the liquid crystal cell.

In addition, in Example 31, it was thought that the polymer 2 (other polymer) was likely to be unevenly distributed on the upper layer of the liquid crystal alignment film, and favorable liquid crystal alignment properties were exhibited in the liquid crystal cell. In Example 31, while a mechanism through which an alignment order of the upper layer of the liquid crystal alignment film increased is not clear, it was speculated that, according to the photo-alignment treatment, the polymer 1 that was unevenly distributed on the lower layer of the liquid crystal alignment film underwent a photoreaction to cause anisotropy, and according to a subsequent heat treatment, the anisotropy was propagated from the lower layer to the upper layer of the liquid crystal alignment film, and the alignment was transferred. In order to promote alignment transfer, it is desirable that the polymer 2 can exhibit thermotropic liquid crystallinity or lyotropic liquid crystallinity in the heat treatment procedure. In addition, in Example 31, it was speculated that the photodegradable product was unevenly distributed on the lower layer of the liquid crystal alignment film, and thus micro bright spots were unlikely to be generated.

On the other hand, in Comparative Example 7 in which a polymer having no partial structure derived from a substituted cyclobutane ring and a partial structure derived from a specific diamine was used, the photoreactivity of the liquid crystal alignment film was "poor" and liquid crystal alignment properties and AC afterimage characteristics of the liquid crystal cell were "poor." In addition, in Comparative Example 7, a polymer having an aromatic ester structure was used, and a photo-alignment treatment was possible due to a photo Fries rearrangement reaction, but it was thought that, under this production condition, an amount of UV light emitted was insufficient, and it was not possible to impart a sufficient liquid crystal alignment ability with respect to the coating film.

While the present disclosure has been described with reference to the embodiments, it is understood that the present disclosure is not limited to the above embodiments and structures. The present disclosure includes various modifications and alternations within the equivalent range. In addition, various combinations and forms, and additionally, other combinations and forms including only one element, or more or fewer than such elements are within the scope and spirit of the present disclosure.

The invention claimed is:

1. A liquid crystal aligning agent comprising a polymer (P) having at least one selected from the group consisting of a partial structure represented by the following Formula (1) and a partial structure represented by the following Formula (2):

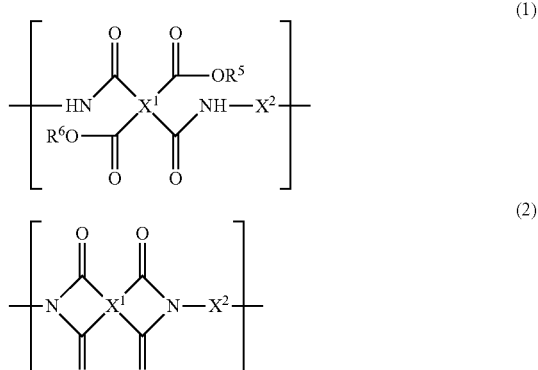

In Formula (1) and Formula (2), $X^1$ is a tetravalent organic group having a cyclobutane ring structure and has at least one substituent in a ring portion of a cyclobutane ring; $X^2$ is a divalent organic group represented by the following Formula (4); $R^5$ and $R^6$ each are independently a hydrogen atom or a monovalent organic group having 1 to 6 carbon atoms,

In Formula (4), $A^1$ and $A^2$ each are independently a divalent aromatic ring group and may have a substituent in a ring portion; here, at least one of $A^1$ and $A^2$ is a divalent nitrogen-containing heterocyclic group in which two hydrogen atoms are removed from a ring portion of one nitrogen-containing heterocyclic ring selected from the group consisting of a pyridine ring, a pyrazine ring, a pyrimidine ring and a pyridazine ring and may have a substituent in a ring portion; $Y^1$ and $Y^2$ each are independently an oxygen atom, a sulfur atom, or —$NR^7$—, wherein $R^7$ is a hydrogen atom or a monovalent organic group; $Z^1$ is a divalent organic group having an aliphatic structure and 1 to 15 carbon atoms, at least one substituent for $Y^1$ and $Y^2$ and $Z^1$ may be bonded to form a ring structure, and substituents for $Y^1$ and $Y^2$ may be bonded to form a ring structure together with $Z^1$, and * indicates a bond.

2. The liquid crystal aligning agent according to claim 1, wherein $Z^1$ is a divalent organic group represented by the following Formula (5):

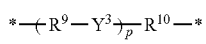
(5)

In Formula (5), $R^9$ and $R^{10}$ each are independently an alkanediyl group, and a total number of carbon atoms for $R^9$ and $R^{10}$ is 1 to 15; here, in Formula (4), at least one substituent for $Y^1$ and $Y^2$ and $R^9$ may be bonded to form a ring structure, at least one substituent for $Y^1$ and $Y^2$ and $R^{10}$ may be bonded to form a ring structure, and at least one substituent for $Y^1$ and $Y^2$ and a substituent for $Y^3$ may be bonded to form a ring structure together with $R^9$ or $R^{10}$; $Y^3$ is an oxygen atom, a sulfur atom, or —$NR^8$—, wherein $R^8$ is a hydrogen atom or a monovalent organic group; p is an integer of 0 to 4; when p is 2 or more, a plurality of $R^9$'s and $Y^3$'s may be the same or different from each other.

3. The liquid crystal aligning agent according to claim 1, wherein $X^1$ is a tetravalent organic group represented by the following Formula (3):

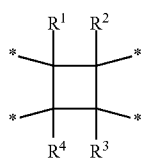
(3)

In Formula (3), $R^1$ to $R^3$ each are independently a hydrogen atom, a halogen atom, an alkyl group having 1 to 6 carbon atoms, a halogenated alkyl group having 1 to 6 carbon atoms, an alkoxy group having 1 to 6 carbon atoms, a thioalkyl group having 1 to 6 carbon atoms, an alkenyl group having 2 to 6 carbon atoms, an alkynyl group having 2 to 6 carbon atoms, or —$COR^{20}$, wherein $R^{20}$ is an alkyl group having 1 to 6 carbon atoms, a fluorine-containing alkyl group, an alkoxy group or a fluorine-containing alkoxy group; $R^4$ is a halogen atom, an alkyl group having 1 to 6 carbon atoms, a halogenated alkyl group having 1 to 6 carbon atoms, an alkoxy group having 1 to 6 carbon atoms, a thioalkyl group having 1 to 6 carbon atoms, an alkenyl group having 2 to 6 carbon atoms, an alkynyl group having 2 to 6 carbon atoms, or —$COR^{20}$; here, adjacent groups among $R^1$ to $R^4$ may be bonded to form a ring structure, and * indicates a bond.

4. The liquid crystal aligning agent according to claim 1, wherein $A^1$ and $A^2$ are both a divalent nitrogen-containing heterocyclic group in which two hydrogen atoms are removed from a ring portion of one nitrogen-containing heterocyclic ring selected from the group consisting of a pyridine ring, a pyrazine ring, a pyrimidine ring and a pyridazine ring, and wherein $Y^1$ and $Y^2$ are bonded to carbon atoms adjacent to nitrogen atoms in the ring of the nitrogen-containing heterocyclic ring with respect to the nitrogen-containing heterocyclic ring that $A^1$ and $A^2$ have.

5. The liquid crystal aligning agent according to claim 4, wherein the nitrogen-containing heterocyclic ring that $A^1$ and $A^2$ have is a pyridine ring, and wherein bonding sites of $Y^1$ and $Y^2$ on the pyridine ring are at the ortho position with respect to a nitrogen atom of the pyridine ring and at the para position with respect to a nitrogen atom in Formula (1) and Formula (2) which is bonded to $X^2$.

6. The liquid crystal aligning agent according to claim 1, wherein at least one of Y and $Y^2$ is —$NR^7$—.

7. A liquid crystal alignment film formed using the liquid crystal aligning agent according to claim 1.

8. A method for producing a liquid crystal alignment film, comprising
a photo-alignment process in which a coating film is framed using the liquid crystal aligning agent according to claim 1, and a light emission treatment is performed on the coating film to impart a liquid crystal alignment ability.

9. The method for producing a liquid crystal alignment film according to claim 8, further comprising
a contact process in which the coating film subjected to the light emission treatment is brought into contact with water, a water-soluble organic solvent, or a solvent in which water and a water-soluble organic solvent are mixed.

10. The method for producing a liquid crystal alignment film according to claim 9, further comprising
a heating process in which the coating film subjected to the light emission treatment is heated in a temperature range of 120° C. or higher and 280° C. or lower in at least one of before the contact process and after the contact process.

11. A liquid crystal element comprising the liquid crystal alignment film according to claim 7.

12. A polymer comprising at least one selected from the group consisting of a partial structure represented by the following Formula (1) and a partial structure represented by the following Formula (2):

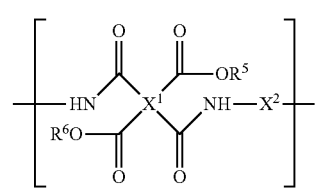
(1)

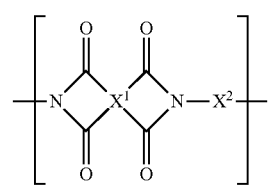
(2)

In Formula (1) and Formula (2), $X^1$ is a tetravalent organic group having a cyclobutane ring structure and has at least one substituent in a ring portion of a cyclobutane ring; $X^2$ is a divalent organic group represented by the following Formula (4); $R^5$ and $R^6$ each are independently a hydrogen atom or a monovalent organic group having 1 to 6 carbon atoms, $$*-A^1-Y^1-Z^1-Y^2-A^2-* \qquad (4)$$

In Formula (4), $A^1$ and $A^2$ each are independently a divalent aromatic ring group and may have a substituent in a ring portion; here, at least one of $A^1$ and $A^2$ is a divalent nitrogen-containing heterocyclic group in which two hydrogen atoms are removed from a ring portion of one nitrogen-containing heterocyclic ring selected from the group consisting of a pyridine ring, a pyrazine ring, a pyrimidine ring and a pyridazine ring and may have a substituent in a ring portion; $Y^1$ and $Y^2$ each are independently an oxygen atom, a sulfur atom, or —$NR^7$—, wherein $R^7$ is a hydrogen atom or a monovalent organic group; $Z^1$ is a divalent organic group having an aliphatic structure and 1 to 15 carbon atoms, at least one substituent for $Y^1$ and $Y^2$ and $Z^1$ may be bonded to form a ring structure, and substituents for $Y^1$ and $Y^2$ may be bonded to form a ring structure together with $Z^1$, and * indicates a bond.

\* \* \* \* \*